US008650626B2

(12) United States Patent
Miyabayashi et al.

(10) Patent No.: US 8,650,626 B2
(45) Date of Patent: Feb. 11, 2014

(54) INFORMATION PROCESSING APPARATUS, INFORMATION PROVIDING SERVER, PROGRAM, COMMUNICATION SYSTEM, AND LOGIN INFORMATION PROVIDING SERVER

(75) Inventors: Naoki Miyabayashi, Tokyo (JP); Isao Soma, Saitama (JP); Takashi Abeno, Kanagawa (JP); Yoshihiro Yoneda, Tokyo (JP); Masahiro Sueyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 12/839,761

(22) Filed: Jul. 20, 2010

(65) Prior Publication Data

US 2011/0113477 A1      May 12, 2011

(30) Foreign Application Priority Data

Jul. 29, 2009    (JP) ................................. 2009-176573

(51) Int. Cl.
*H04L 29/06*    (2006.01)
(52) U.S. Cl.
USPC .................................................. 726/7; 726/3
(58) Field of Classification Search
USPC ........................................................ 726/7, 3
See application file for complete search history.

(56) References Cited

U.S. PATENT DOCUMENTS

| 2006/0015739 | A1* | 1/2006 | Suzuki ........................... 713/182 |
| 2008/0072061 | A1  | 3/2008 | Cannon et al. |
| 2008/0092217 | A1* | 4/2008 | Nagami et al. ..................... 726/5 |
| 2010/0114773 | A1* | 5/2010 | Skowronek ....................... 705/44 |
| 2010/0169962 | A1* | 7/2010 | Lu ....................................... 726/9 |
| 2010/0235637 | A1* | 9/2010 | Lu et al. ........................ 713/168 |

FOREIGN PATENT DOCUMENTS

| EP | 1536306     | 6/2005  |
| GB | 2394326     | 4/2004  |
| JP | 2000-322383 | 11/2000 |
| JP | 2002-245011 | 8/2002  |
| JP | 2002-366868 | 12/2002 |
| JP | 2002-366869 | 12/2002 |
| JP | 2006-163582 | 6/2006  |
| JP | 2008-225573 | 9/2008  |
| JP | 2008-250923 | 10/2008 |
| JP | 2009-116800 | 5/2009  |
| WO | 2007-107868 | 9/2007  |
| WO | 2009-001197 | 12/2008 |

OTHER PUBLICATIONS

European Patent Office, European Search Report issued in connection with European Patent Application Serial No. 10170420.3, dated Dec. 16, 2011. (4 pages).
Japanese Patent Office, Office action issued in connection with Japanese Patent Application No. 2009-176573, dated Aug. 13, 2013. (4 pages).

* cited by examiner

*Primary Examiner* — Brandon Hoffman
*Assistant Examiner* — Thong Truong
(74) *Attorney, Agent, or Firm* — K&L Gates LLP

(57)    ABSTRACT

In one example embodiment, the communication system disclosed herein includes an information processing apparatus that acquires address information from a memory device having a free area including the address information and a secure area including account information. The information processing apparatus connects to a resource of a server using the acquired address information. The information processing apparatus causes a security server to acquire the account information from the memory device and transmit the acquired account information to the server such that the server enables a user to access the resource of the server using the account information.

25 Claims, 17 Drawing Sheets

INFORMATION PROCESSING APPARATUS, INFORMATION PROVIDING SERVER, PROGRAM, COMMUNICATION SYSTEM, AND LOGIN INFORMATION PROVIDING SERVER

CROSS REFERENCES TO RELATED APPLICATIONS

The present application claims priority to Japanese Patent Application No. JP 2009-176573, filed in the Japanese Patent Office on Jul. 29, 2009, the entire contents of which is being incorporated herein by reference.

BACKGROUND

JP-A-2002-366868 discloses an existing system for purchasing goods by connecting to an e-commerce server of a virtual store on a communication network. This patent document discloses a system provided with an e-commerce support server that requests for unique number data in an IC card with a credit card function and that transmits to an e-commerce server creditworthiness data that is generated by converting the received unique number.

Also, JP-A-2002-366859 discloses an intermediate system that transfers information such as a credit card number from an affiliate store to a card issuer and that submits a credit request.

However, according to the existing technologies described above, loan and identity verification are both performed by an agency server, and a process of returning the results to an e-commerce server and an affiliate store terminal which are the actual business entities is performed. This method has a demerit that the configuration of the agency server becomes complicated and the system grows in scale, thereby making tremendous costs necessary for the construction of the system.

SUMMARY

In light of the foregoing, it is desirable to provide an information processing apparatus, an information providing server, a program, a communication system, and a login information providing server which are novel and improved, and which are capable of performing identity verification by a secure configuration.

In an example embodiment, the information processing apparatus includes: a processor; a communication unit operatively coupled to the processor; and a memory device operatively coupled to the processor, the memory device storing instructions that cause the processor, in cooperation with the communication unit and the memory device, to, in response to a contactless communication: (a) acquire address information from a second memory device having: (i) a free area including the address information; and (ii) a secure area including account information; (b) connect to a resource of a server using the acquired address information; and (c) cause a security server to: (i) establish a secure communication path; (ii) acquire the account information from the second memory device; and (ii) transmit the acquired account information to the server such that the server enables a user to access the resource of the server using the account information.

In an example embodiment, the contactless communication occurs in response to a communication card being brought into contact or into proximity with a card reader/writer.

In an example embodiment, the instructions cause the processor to request, from the server, a session number used for confirming access to the resource of the server.

In an example embodiment, the information processing apparatus includes a reader/writer operatively coupled to the processor. In an example embodiment, the instructions cause the processor to operate with the reader/writer to acquire the address information.

In an example embodiment, the second memory device is included in the information processing apparatus. In an example embodiment, the second memory device is included in a contactless communication card that is separate from the information processing apparatus.

In an example embodiment, the address information includes a URL. In an example embodiment, the account information includes login information. In an example embodiment, the server includes a web server.

In an example embodiment, the information processing apparatus includes a display device operatively coupled to the processor. In an example embodiment, the method includes causing the processor to execute the instructions to operate with the display device to display a login screen.

In an example embodiment, a method of operating an information processing apparatus including instructions includes: in response to a contactless communication: (a) causing a processor to execute the instructions to acquire address information from a second memory device having: (i) a free area including the address information; and (ii) a secure area including account information; (b) causing the processor to execute the instructions to connect to a resource of a server using the acquired address information; and (c) causing the processor to execute the instructions to cause a security server to: (i) establish a secure communication path; (ii) acquire the account information from the second memory device; and (iii) transmit the acquired account information to the server such that the server enables a user to access the resource of the server using the account information.

In an example embodiment, the contactless communication occurs in response to a communication card being brought into contact or into proximity with a card reader/writer.

In an example embodiment, the method includes causing the processor to execute the instructions to request, from the server, a session number used for confirming access to the resource of the server.

In an example embodiment, the information processing apparatus includes a reader/writer. In an example embodiment, the method includes causing the processor to execute the instructions to operate with the reader/writer to acquire the address information.

In an example embodiment, the information processing apparatus includes the second memory device. In an example embodiment, the second memory device is included in a contactless communication card that is separate from the information processing apparatus. In an example embodiment, the address information includes a URL. In an example embodiment, the account information includes login information. In an example embodiment, the server includes a web server.

In an example embodiment, the information processing apparatus includes a display device. In an example embodiment, the method includes causing the processor to operate with the display device to display a login screen.

In an example embodiment, the server includes: a processor; a communication unit operatively coupled to the processor; and a memory device operatively coupled to the processor, the memory device storing instructions that cause the processor, in cooperation with the communication unit and the memory device, to, in response to a contactless communication: (a) connect to an information processing apparatus, the information processing apparatus being configured to connect to the server by using address information acquired from a second memory device having: (i) a free area including the address information; and (ii) a secure area including account information; (b) acquire the account information from a security server, the security server being configured to acquire the account information from the secure area of the second memory device; and (c) enable a user to access a resource of the server using the acquired account information from the security server.

In an example embodiment, the contactless communication occurs in response to a communication card being brought into contact or into proximity with a card reader/writer.

In an example embodiment, the instructions cause the processor to issue a session number to the information processing apparatus, the session number being used for confirming access to the resource of the server.

In an example embodiment, the address information includes a URL. In an example embodiment, the account information includes login information. In an example embodiment, the server is a web server. In an example embodiment, the information processing apparatus includes the second memory device.

In an example embodiment, the contactless communication occurs in response to a communication card being brought into contact or into proximity with a card reader/writer.

In an example embodiment, the method of operating a server including instructions includes: in response to a contactless communication: (a) causing a processor to execute the instructions to operate with a communication unit to connect to an information processing apparatus, the information processing apparatus being configured to connect to the server by using address information acquired from a second memory device having: (i) a free area including the address information; and (ii) a secure area including account information; (b) causing the processor to execute the instructions to acquire the account information from a security server, the security server being configured to acquire the account information from the secure area of the second memory device; and (c) causing the processor to execute the instructions to enable a user to access a resource of the server using the acquired account information from the security server.

In an example embodiment, the contactless communication occurs in response to a communication card being brought into contact or into proximity with a card reader/writer.

In an example embodiment, the method includes causing the processor to execute the instructions to issue a session number to the information processing apparatus, the session number being used for confirming access to the resource of the server.

In an example embodiment, the address information includes a URL. In an example embodiment, the account information includes login information. In an example embodiment, the server is a web server.

In an example embodiment, the information processing apparatus includes the second memory device.

In an example embodiment, an information processing apparatus includes: a processor; a communication unit operatively coupled to the processor; and a first memory device operatively coupled to the processor, the memory device storing instructions that cause the processor, in cooperation with the communication unit and the memory device, to, in response to contactless communication: (a) cause a display device to start a browser of a security server; (b) acquire address information from a second memory device having: (i) a free area including the address information; and (ii) a secure area including account information; (c) via the browser of the security server, access a server using the acquired address information; and (d) cause the security server to: (i) establish a secure communication path; (ii) enable a user to select a first access destination or a second access destination; (iii) in response to the first access destination being selected, access the information processing apparatus; and (iv) in response to the second access destination being selected, access the secure area of the second memory device.

In an example embodiment, the contactless communication occurs in response to a communication card being brought into contact or into proximity with a card reader/writer. In an example embodiment, the information processing apparatus includes a reader/writer operatively coupled to the processor. In an example embodiment, the instructions cause the processor to operate with the reader/writer to acquire the address information.

In an example embodiment, the second memory device is included in the information processing apparatus. In an example embodiment, the second memory device is included in a contactless communication card that is separate from the information processing apparatus.

In an example embodiment, the address information includes a URL. In an example embodiment, the account information includes login information. In an example embodiment, the server includes a web server.

In an example embodiment, a method of operating an information processing apparatus including instructions includes: in response to contactless communication: (a) causing a processor to execute the instructions to cause a display device to start a browser of a security server; (b) causing the processor to execute the instructions to acquire address information from a second memory device having: (i) a free area including the address information; and (ii) a secure area including account information; (c) causing the processor to execute the instructions to, via the browser of the security server, access a server using the acquired address information; and (d) causing the security server to: (i) establish a secure communication path; (ii) enable a user to select a first access destination or a second access destination; (iii) in response to the first access destination being selected, access the information processing apparatus; and (iv) in response to the second access destination being selected, access the secure area of the second memory device.

In an example embodiment, the contactless communication occurs in response to a communication card being brought into contact or into proximity with a card reader/writer.

In an example embodiment, the information processing apparatus includes a reader/writer. In an example embodiment, the method includes causing the processor to execute the instructions to operate with the reader/writer to acquire the address information.

In an example embodiment, the information processing apparatus includes the second memory device. In an example embodiment, the second memory device is included in a contactless communication card that is separate from the information processing apparatus.

In an example embodiment, the address information includes a URL. In an example embodiment, the account information includes login information. In an example embodiment, the server includes a web server.

According to the embodiments of the present disclosure described above, there can be provided an information processing apparatus, an information providing server, a program, a communication system, and a login information providing server which are capable to performing identity verification by a secure configuration.

Additional features and advantages are described herein, and will be apparent from the following Detailed Description and the figures.

DETAILED DESCRIPTION

Figure 1:
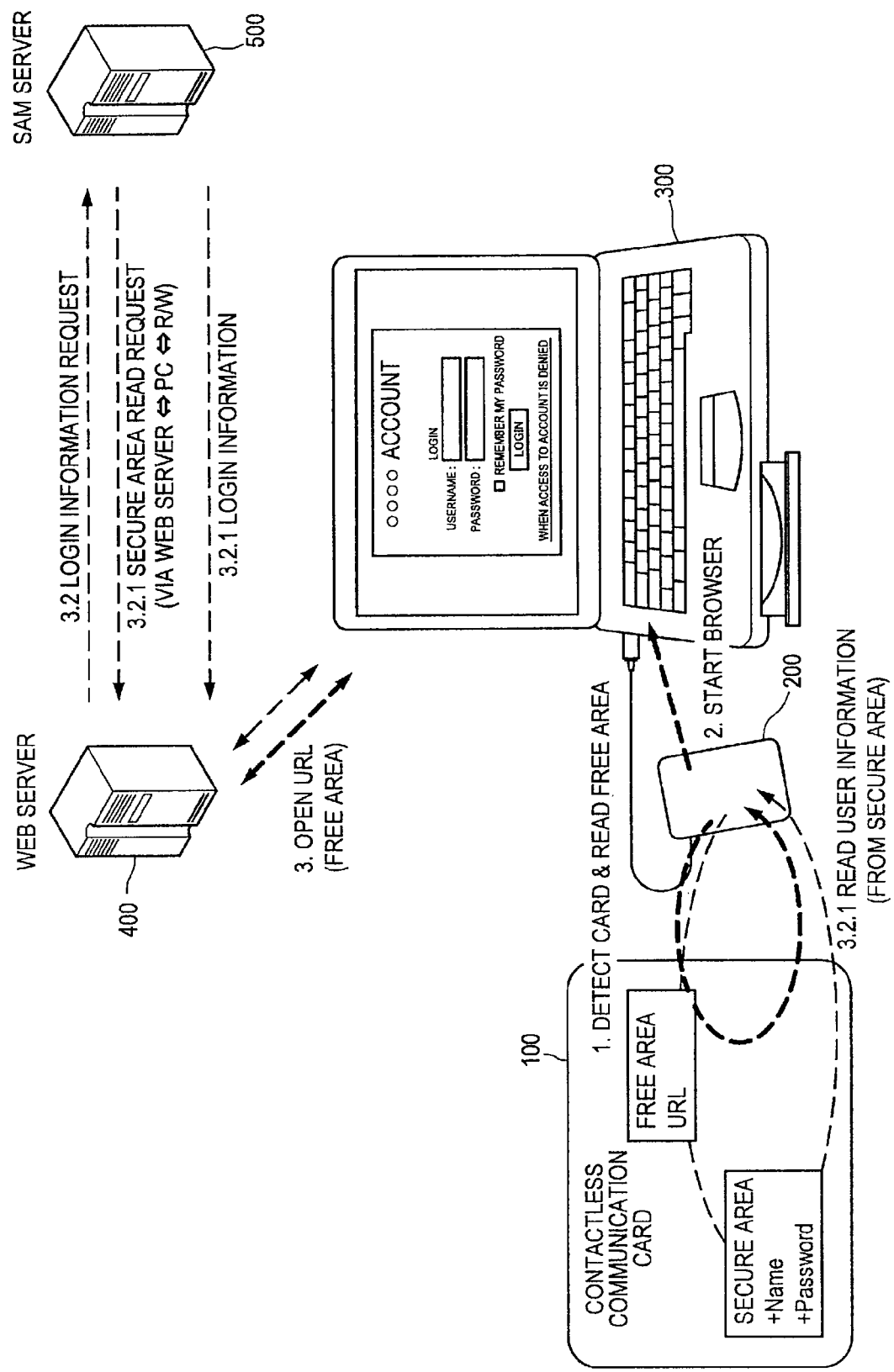
FIG. 1 is a conceptual diagram schematically showing a system configuration according to a first embodiment, and information exchange.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Additionally, an explanation will be given in the following order:

1. First Embodiment (Configuration Example of Acquiring Login Information from SAM Server).
2. Second Embodiment (Example of Assigning Session Number for Login Identification).
3. Third Embodiment (Example of Connecting to Access URL on Virtual Web of SAM Server).

1. First Embodiment

FIG. 1 is a conceptual diagram schematically showing a system configuration according to a first embodiment, and information exchange. As shown in the conceptual diagram of FIG. 1, a system according to the present embodiment includes a contactless communication card 100, a card reader/writer 200, a personal computer 300, a Web server 400, and a SAM (Secure Application Module) server 500.

Describing the concept of information exchange of the present embodiment based on FIG. 1, the contactless communication card 100 includes within its memory a free area and a secure area. Information such as a URL is stored in the free area, and login information such as a username and a password is stored in the secure area. When the contactless communication card 100 is brought into contact or into proximity with the card reader/writer 200, the browser of the personal computer 300 is started, and the URL stored in the free area of the contactless communication card 100 is opened by the communication with the Web server 400.

When the URL of the Web server 400 is opened, the login information such as a username and a password is requested. The Web server 400 requests the SAM server 500 for these pieces of login information. The SAM server 500 requests the contactless communication card 100, via the Web server 400, the personal computer (PC) 300 and the card reader/writer 200, for the readout from the secure area of the contactless communication card 100, and acquires the login information. Then, the SAM server 500 transmits the acquired login information to the Web server 400. The Web server 400 logs in to the URL using the received login information. This enables a user to access the URL of the Web server 400 by simply bringing the contactless communication card 100 into contact or into proximity with the card reader/writer 200.

Figure 2:
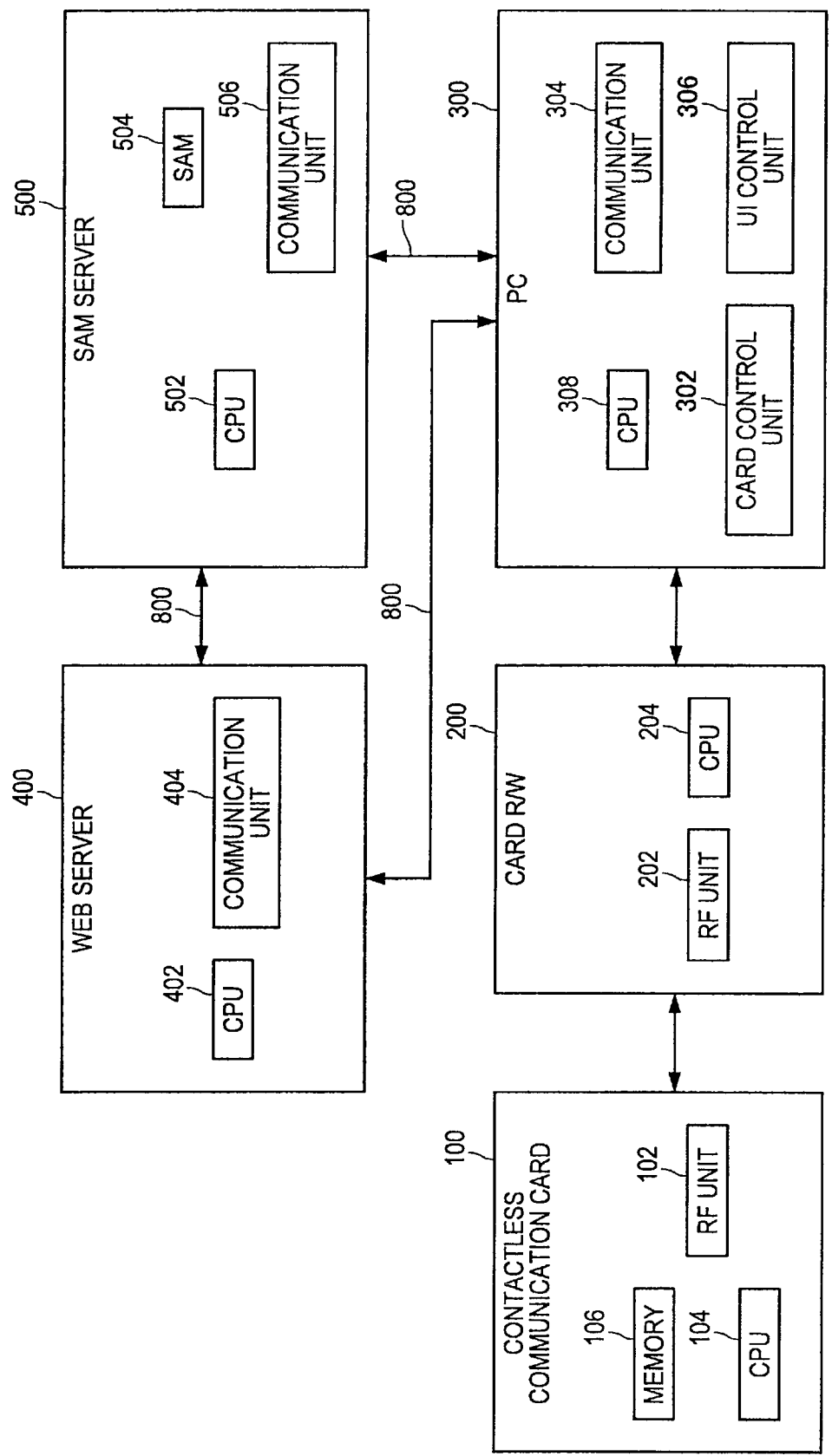
FIG. 2 is a schematic diagram showing the configuration of a system according to the first embodiment of the present disclosure.

Next, the system of the present embodiment will be described in detail based on FIGS. 2 to 4. FIG. 2 is a schematic diagram showing the configuration of the system according to the first embodiment of the present disclosure. As shown in FIG. 2, the system of the present embodiment includes the contactless communication card 100, the card reader/writer (R/W) 200, the personal computer (PC) 300, the Web server 400, and the SAM (Secure Application Module) server 500. The personal computer 300, the Web server 400, and the SAM server 500 are connected in such a way that communication with each other is possible via the Internet 800.

The contactless communication card 100 includes an RF unit 102, a CPU 104, and a memory 106. The RF unit 102 extracts a baseband signal that has been superimposed by a Manchester scheme from a carrier (RF signal) in 13.56 MHz band generated by the card reader/writer 200, and receives data. Also, the RF unit 102 transmits data to the card reader/writer 200 by superimposing on the carrier the baseband signal of the contactless communication card 100. The CPU 104 performs these communication controls, an access control to the memory 106 in the card, and encryption/decryption process of data. The memory 106 has its area divided for each service, and each area is set with an attribute of writable/readable. Specifically, mainly two attributes are determined for the area of the memory 106: an area to which access through authentication and encryption is necessary (hereunder, referred to as a secure area), and an area with no access restriction (hereunder, referred to as a free area.

The card reader/writer 200 includes an RF unit 202, and a CPU 204. The RF unit 202 generates a carrier in 13.56 MHz band, and communicates with the contactless communication card 100 by superimposition of a baseband signal on a transmitted wave and extraction of a baseband signal from a received wave. The CPU 204 converts a communication control command that is received from the personal computer 300 to a baseband signal, and transmits the same to the RF unit 202. Also, the CPU 204 transforms a baseband signal that is received from the RF unit 202 into a communication control command format for a PC, and transmits the same to the personal computer 300.

The personal computer 300 includes a card control unit 302, a communication unit 304, a user interface (UI) unit 306, and a CPU 308. The card control unit 302 issues a card control command, and performs transmission/reception with the card reader/writer 200. The communication unit 304 communicates with a server on the Internet 800, such as the SAM server 500, the Web server 400, and the like. The user interface unit 306 has a function of means for a user to input instruction by a keyboard, a mouse, or the like, or of output means for the user, such as a display, a sound output unit, or the like. The CPU 308 displays and controls a Web browser based on html information obtained from a server. Furthermore, the CPU 308 encrypts an Internet communication path based on encryption setting information shared with a server, and converts a control signal from the SAM server 500 to the card reader/writer 200.

Next, an explanation will be given on a process to be performed by the system of the first embodiment, based on the sequence diagram of FIG. 3. First, an explanation will be given on the reading of card. The personal computer 300 transmits a read control signal to the card reader/writer 200 to read information in the free area of the contactless communication card 100 (step S10).

Next, the card reader/writer 200 performs polling (step S12). Here, the card reader/writer 200 detects a card by sending a carrier. When an antenna of the contactless communication card 100 receives the carrier and the CPU 104 is activated by the power, the contactless communication card 100 returns a unique identifier (IDm) and the type of the card (system code).

1.2) Free Area Reading

The card reader/writer 200 that succeeded in detecting the card accesses the access free area in the contactless communication card 100. The card reader/writer 200 reads the destination URL (start URL) to be used at the time of the Web browser of the personal computer 300 connecting to the Internet and the URL of the SAM server 500 provided with a SAM (Secure Application Module) (step S14). This causes the destination URL of the Web browser and the URL of the SAM server 500 to be sent to the card reader/writer 200 (step S16), and furthermore, to the personal computer 300 (step S18).

2) Web Browser Start

The personal computer 300 starts a Web browser for displaying an html file received from the Web server 400 (step S20). Additionally, Internet Explorer, Firefox or the like can be used as the Web browser, for example.

3) http_get (Start URL, SAM_URL) Command Transmission

The Web browser of the personal computer 300 transmits a http_get command (including the start URL and the URL of the SAM server 500) (step S22), and connects to the URL of the Web server 400 via the Internet 800 by the http_get command. The Web browser of the personal computer 300 passes the URL of the SAM server 500 to the Web server 400. Then, the Web browser of the personal computer 300 analyses the received data in a http format acquired by the http_get command, and displays a login screen. Here, the address (URL) of the SAM server 500 is added to the http_get command as an argument. The addition of the address (URL) of the SAM server to the http_get command can be performed such as https://www.sample_web_server.co.jp/sam_login.cgi?URL=https://www.sam_server.co.jp , for example.

3.1) Communication Path Encryption

When the http_get command is received from the personal computer 300, the Web server 400 operates a CGI, and encrypts the communication path to the SAM server 500 by SSL or the like (step S24). Then, the Web server 400 accesses the SAM server 500 by using the URL of the SAM server 500 acquired from the personal computer 300.

3.2) Login Information Request

The Web server 400 requests the SAM server 500 for login information (step S26). The SAM server 500 acquires the login information (username and password) from the secure area of the contactless communication card 100 (step S28), and logs in to the Web server 500. The process of step S28 will be described in detail below.

3.2.1) Details of Login Information Acquisition

Figure 3:
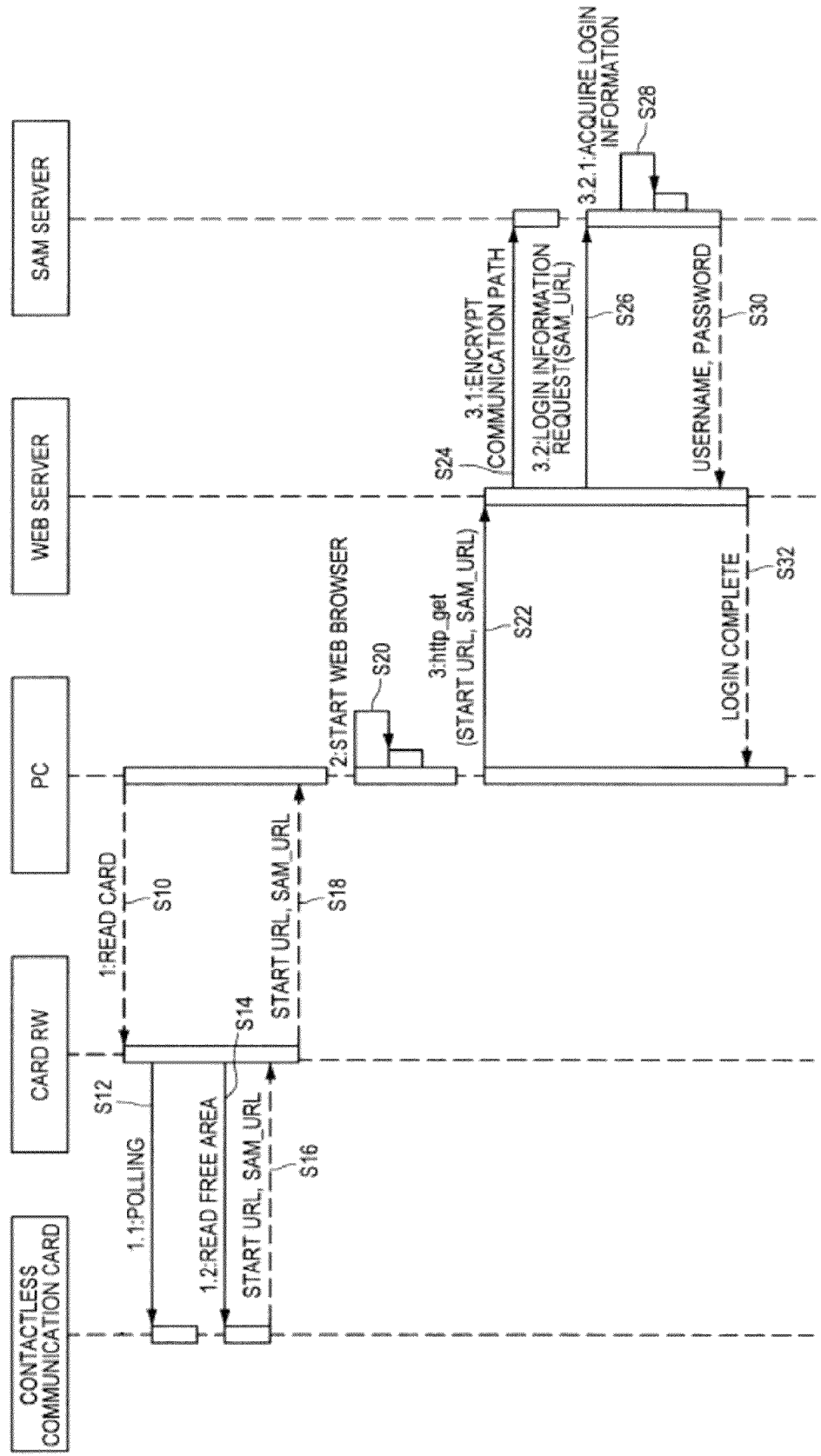
FIG. 3 is a sequence diagram for describing a process performed by the system of the first embodiment.
Figure 4:
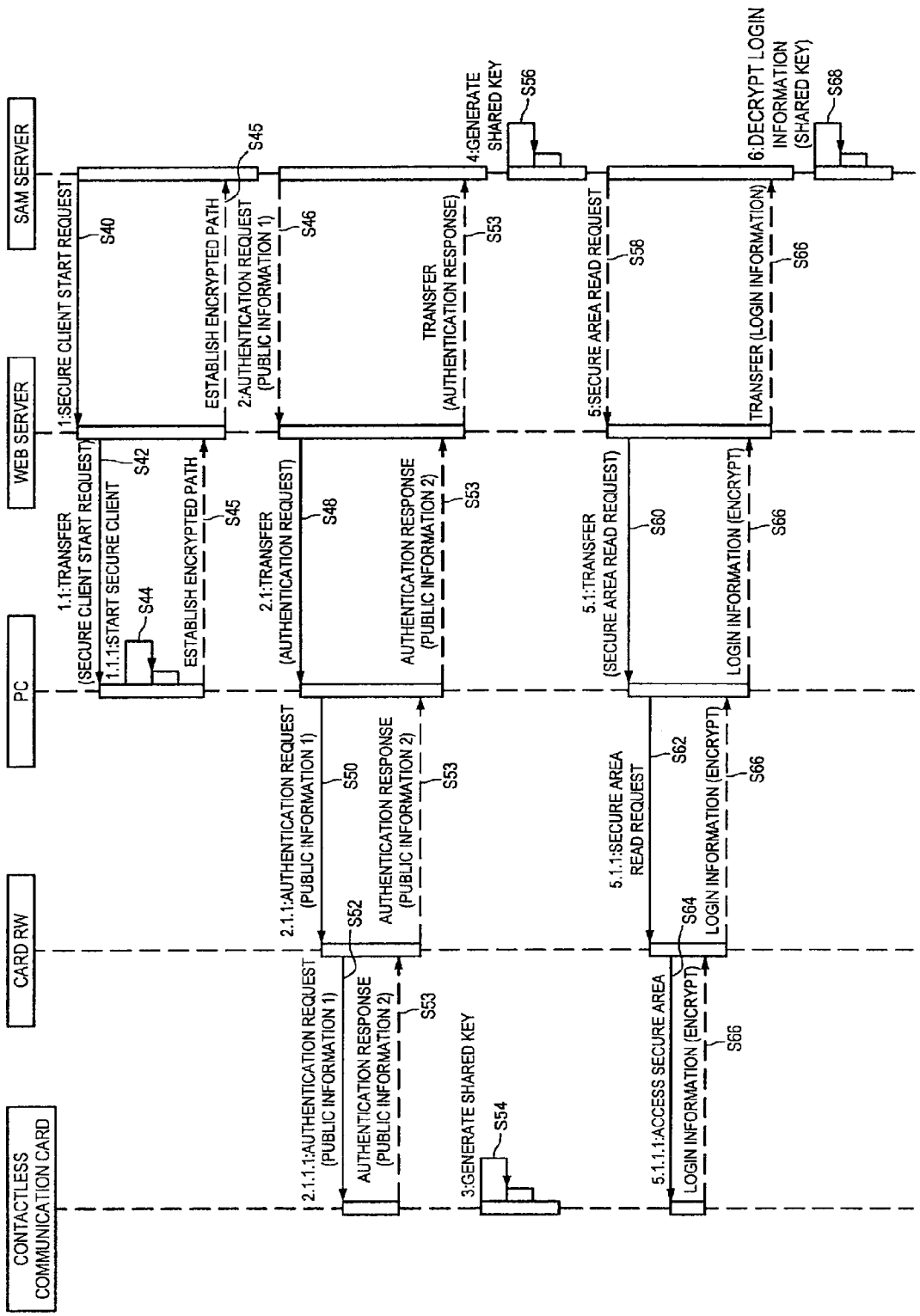
FIG. 4 is a sequence diagram showing the details of a login information acquisition procedure of step S28 in FIG. 3 between a SAM server and a contactless communication card.

FIG. 4 is a sequence diagram showing the details of a login information acquisition procedure of step S28 in FIG. 3 between the SAM server 500 and the contactless communication card 100.

Secure Client Start Request

The SAM server 500 transmits, to the Web server 400, a security client request command for the personal computer 300 (step S40).

1.1) Transfer (Secure Client Start Request)

First, the SAM server 500 issues a secure client start request to the Web server 400 by transmitting the http_get command or the like (step S40). The secure client is a program held in the personal computer 300. The Web server 400 transfers the request command for the secure client to the personal computer 300 connected by using the http_get command (step S42).

1.1.1) Secure Client Start

The CPU 308 within the personal computer 300 that received the security client start command starts the security client (step S44). This client program encrypts the communication path between the SAM server 500 and the personal computer 300. Also, this client program converts the card control command received from the SAM server 500 to a control command of the card reader/writer 200, and performs card control for the contactless communication card 100. This causes the path from the personal computer 300 to the SAM server 500 via the Web server 400 to be encrypted, and causes a packet to be transmitted/received between the SAM server 500, the Web server 400, and the personal computer 300 to be encrypted. Accordingly, what kind of command is transmitted to the contactless communication card 100 can be hidden.

2) Authentication Request (Public Information 1)

The SAM server 500 that established the encrypted communication path transmits an authentication request command to the personal computer 300 to request the contactless communication card 100 for the authentication of the encryption (step S46). Public information (public key) 1 generated by a random number N1 and a private key A is included in this command. The authentication request is performed in an encrypted transmission path between the SAM server 500, the Web server 400, and the personal computer 300. Additionally, it is assumed that the contactless communication card 100 is in proximity or in contact with the card reader/ writer 200 at this time point, and that it is able to communicate with the card reader/writer 200.

1) Transfer (Authentication Request)

The Web server 400 that received the authentication request command from the SAM server 500 transfers the command to the personal computer 300 as it is (step S48).

2.1.1) Authentication Request (Public Information 1)

After converting the authentication request command to that for the card reader/writer 200, the personal computer 300 transmits the same to the card reader/writer 200 (step S50).

2.1.1.1) Authentication Request (Public Information 1)

After converting the authentication request command to an RF signal, the card reader/writer 200 transmits the same to the contactless communication card 100 (step S52). The private key A is stored in the contactless communication card 100, and thus the contactless communication card 100 generates public information (public key) 2 by this key A and a random number N2. The public information 2 is returned to the SAM server 500 via the card reader/writer 200, the personal computer 300, and the Web server 400.

3), 4) Shared Key Generation

By transmitting/receiving and exchanging the public information 1 and 2, the contactless communication card 100 and the SAM server 500 each generate a shared key (private key), which is the same key for both the contactless communication card 100 and the SAM server 500 (steps S54, S56), and the shared key is shared. After the shared key is generated, a read value of a necessary area in the secure area of the contactless communication card 100 is transmitted, being encrypted by this shared key. Additionally, the generation of the shared key from step S46 to step S56 can be performed by a method generally called "Diffie-Hellman key exchange". The encrypted communication path from the SAM server 500 to the contactless communication card 100 is formed in this manner, and the SAM server 500 and the contactless communication card 100 will be in a state where secure communication is possible.

5) Security Area Read Request

To acquire the login information (username, password, and the like) written in the secure area of the contactless communication card 100, the SAM server 500 transmits to the personal computer 300, via the Web server 400, a Read request for the secure area of the contactless communication card 100, using the encrypted communication path (step S58). Information on an area to be accessed (service area) on the memory 106 of the contactless communication card 100 is included in the Read request for the secure area.

5.1) Transfer (Secure Area Read Request)

The Web server 400 that received the Read request for the secure area from the SAM server 500 transmits the command to the personal computer 300 as it is (step S60).

5.1.1) Secure Area Read Request

When the Read request for the secure area is received, the security client on the personal computer 300 converts the Read request for the secure area into a command format for the card reader/writer 200, and transmits the same to the card reader/writer 200 (step S62).

5.1.1.1) Secure Area Access

The card reader/writer 200 that received the Read request for the secure area accesses the secure area of the contactless communication card 100 (step S64). The contactless communication card 100 encrypts the login information (username and password) stored in the secure area by the shared key, and returns it to the SAM server 500 via the encrypted transmission path (step S66).

6) Login Information Decryption

When the login information of the contactless communication card 100 is received from the encrypted transmission path, the SAM server 500 decrypts the encrypted login information by using the shared key (step S68).

The SAM server 500 can acquire the login information from the contactless communication card 100 in step S28 in FIG. 3 by the sequence in FIG. 4 described above.

The SAM server 500 sends the decrypted login information to the Web server 400 (step S30 in FIG. 3). The Web server 400 performs login by the received decrypted login information. The login to the Web server 400 is thus completed (step S30), and a screen after login is displayed on the screen of the personal computer 300. Accordingly, a user can check on the Web browser screen of the personal computer 300 that he/she has logged in.

Accordingly, since the login information of the secure area of the contactless communication card 100 is transmitted from the SAM server 500 to the Web server 400, the user can automatically log in to the Web server 400 without inputting the username, the password, or the like, to the login screen.

Figure 5:
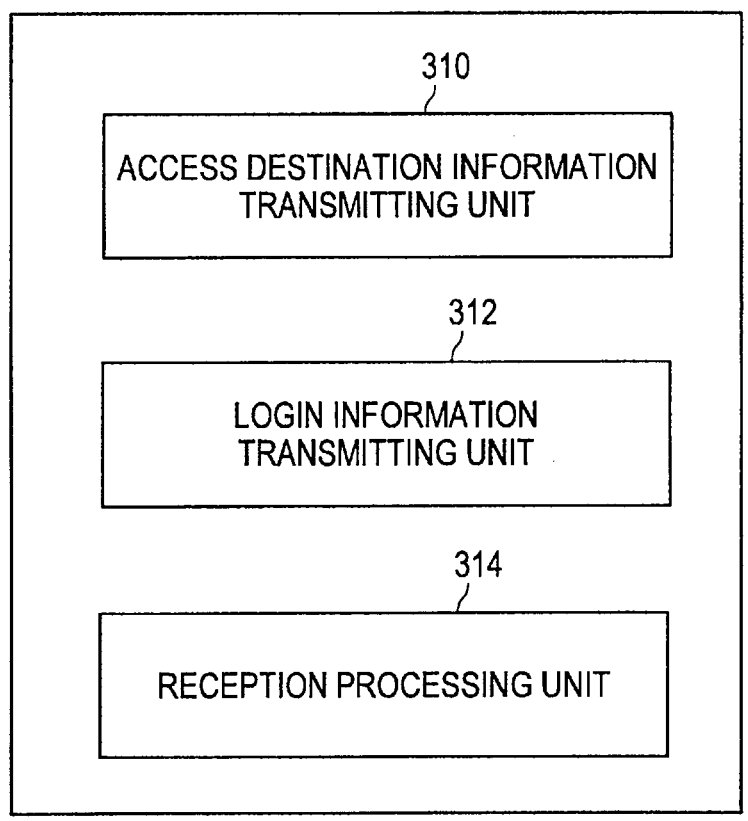
FIG. 5 is a functional block diagram showing the configuration of a personal computer according to the first embodiment.

FIG. 5 is a functional block diagram showing the configuration of the personal computer 300 according to the first embodiment. As shown in FIG. 5, the personal computer 300 includes an access destination information transmitting unit 310, a login information transmitting unit 312, and a reception processing unit 314. Each functional block can be configured from hardware, the CPU 308, and software (program) for causing the CPU 308 to function that are provided in the personal computer 300. The program can be stored in a hard disk provided in the personal computer 300, or in a recording medium such as a memory that is externally connected to the personal computer 300.

Figure 6:
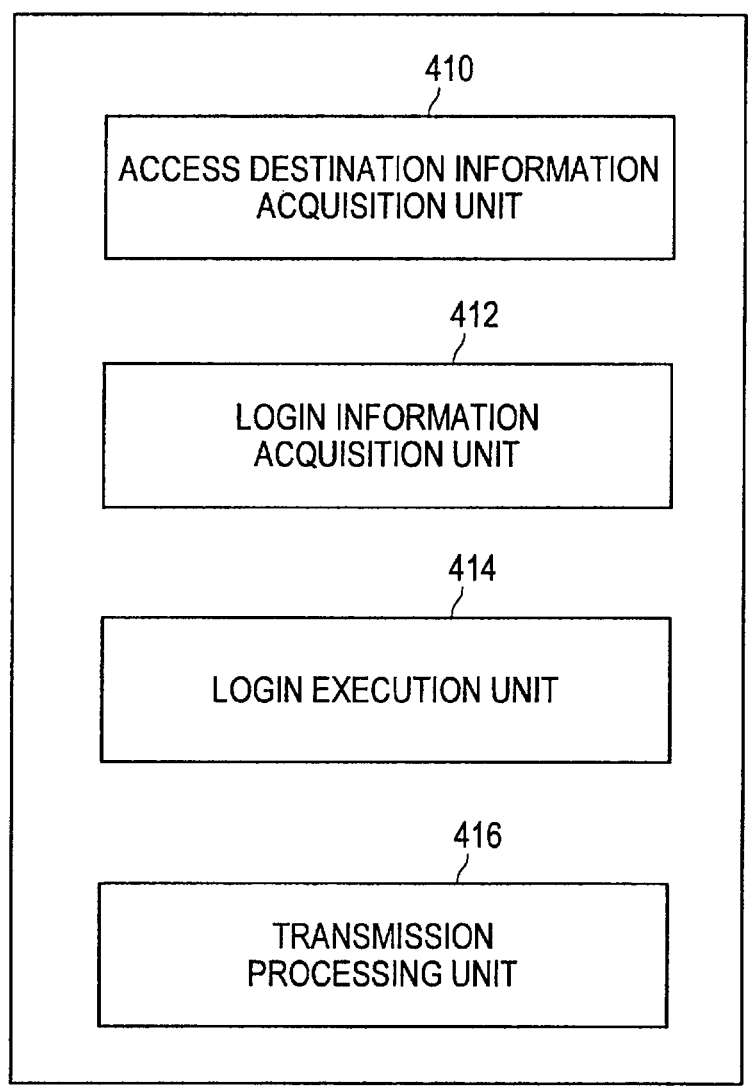
FIG. 6 is a functional block diagram showing the configuration of a Web server according to the first embodiment.

Furthermore, FIG. 6 is a functional block diagram showing the configuration of the Web server 400 according to the first embodiment. As shown in FIG. 6, the Web server 400 includes an access destination information acquisition unit 410, a login information acquisition unit 412, a login execution unit 414, and a transmission processing unit 416. Each functional block can be configured from hardware, a CPU 402, and software (program) for causing the CPU 402 to function that are provided in the Web server 400. The program can be stored in a hard disk provided in the Web server 400, or in a recording medium such as a memory that is externally connected to the Web server 400.

As described above, according to the first embodiment, the SAM server 500 sends the login information that has been sent to the SAM server 500 from the encrypted transmission path to the Web server 400, and logs in to the Web server 400. This allows a user to perform easy login by simply holding the contactless communication card 100 over the card reader/writer 200.

2. Second Embodiment

Next, an explanation will be given on the second embodiment of the present disclosure. The second embodiment relates to a login through the SAM server 500 using a session number.

Figure 7:
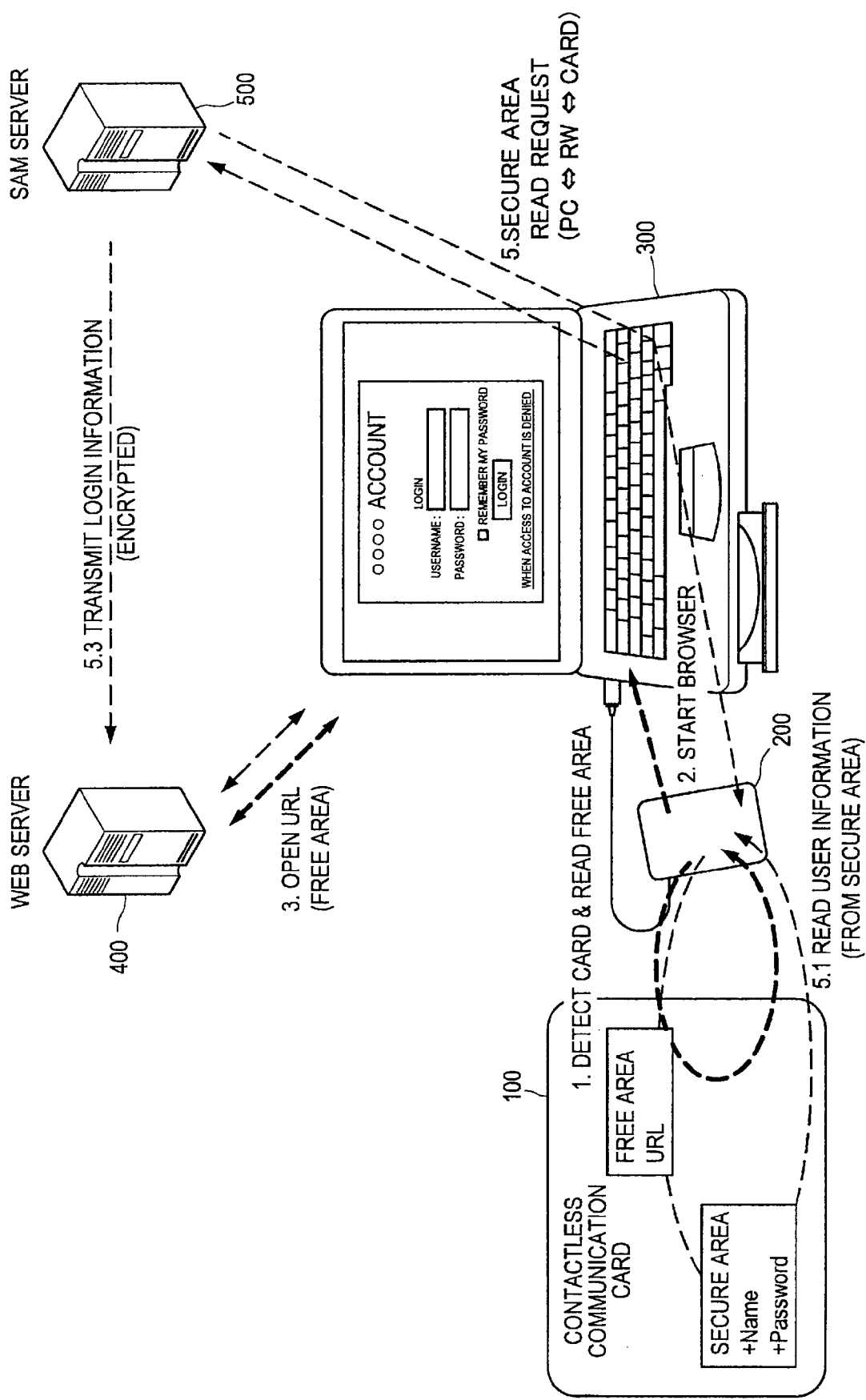
FIG. 7 is a conceptual diagram schematically showing a system configuration according to a second embodiment, and information exchange.

FIG. 7 is a conceptual diagram schematically showing a system configuration according to the second embodiment, and information exchange. As shown in the conceptual diagram of FIG. 7, the system of the present embodiment also includes the contactless communication card 100, the card reader/writer 200, the personal computer 300, the Web server 400, and the SAM (Secure Application Module) server 500.

Describing the concept of information exchange of the present embodiment based on FIG. 7, the contactless communication card 100 includes within its memory a free area and a secure area. Information such as a URL is stored in the free area, and login information such as a username and a password is stored in the secure area. When the contactless communication card 100 is brought into contact or into proximity with the card reader/writer 200, the browser of the personal computer 300 is started, and the URL stored in the free area of the contactless communication card 100 is opened by the communication with the Web server 400.

When the URL of the Web server 400 is opened, the login information such as a username and a password is requested. The personal computer 300 requests the SAM server 500 for these pieces of login information. The SAM server 500 requests the contactless communication card 100, via the personal computer (PC) 300 and the card reader/writer 200, for the readout from the secure area of the contactless communication card 100, and acquires the login information. Then, the SAM server 500 transmits the acquired login information to the Web server 400. The Web server 400 logs in to the URL by the received login information. This enables a user to access the URL of the Web server 400 by simply bringing the contactless communication card 100 into contact or into proximity with the card reader/writer 200.

Next, the system of the present embodiment will be described in detail based on FIGS. 8 and 9. The system configuration according to the second embodiment and the configurations of the contactless communication card 100, the card reader/writer 200, the personal computer 300, the Web server 400, and the SAM server 500 are the same as those in FIG. 2.

Figure 8:
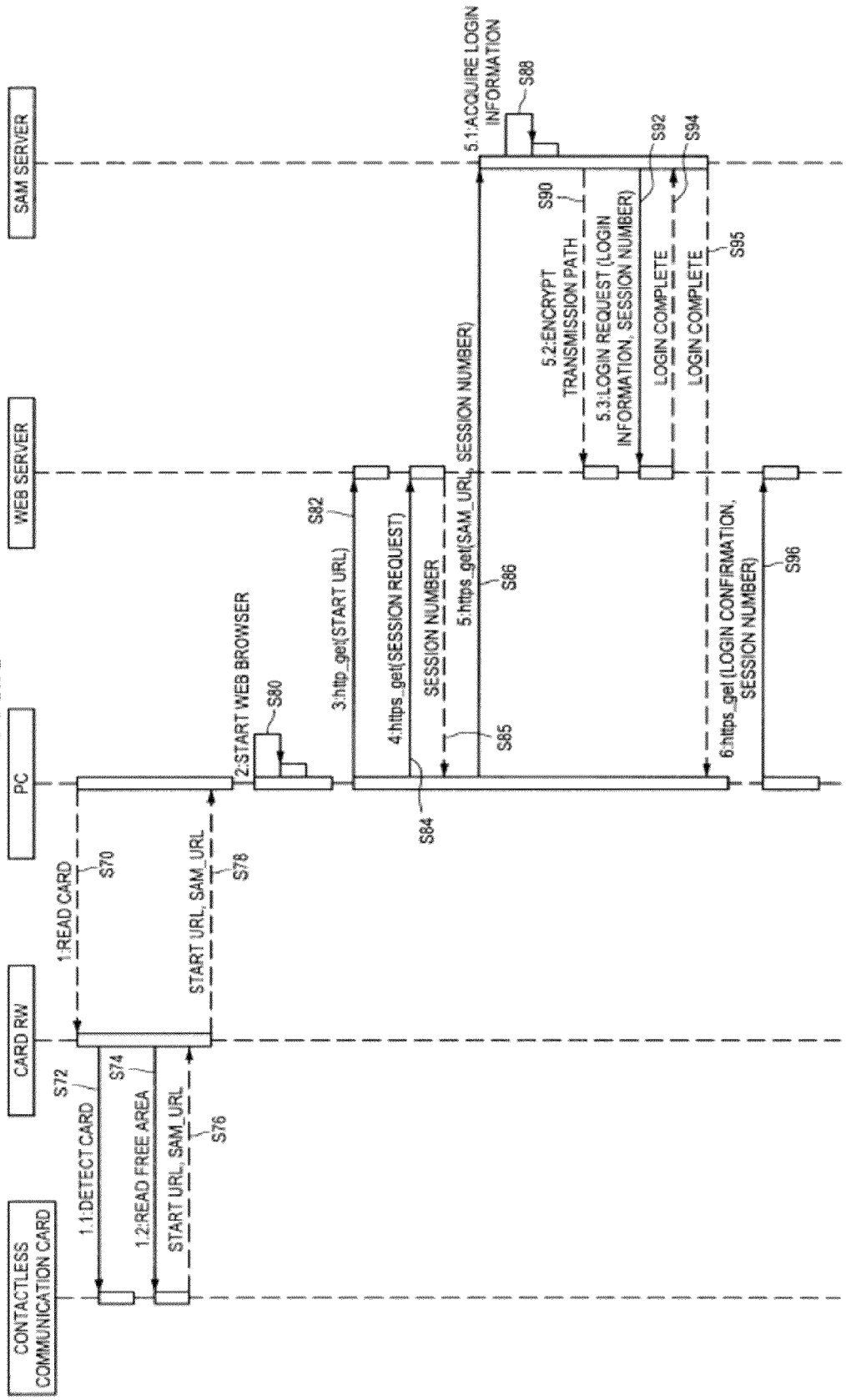
FIG. 8 is a sequence diagram showing a process performed by the system of the second embodiment.

FIG. 8 is a sequence diagram showing a process performed by the system of the second embodiment. First, the personal computer 300 reads the contactless communication card (steps S70 to S78). Then, the personal computer 300 starts a Web browser (step S80). The processes of steps S70 to S80 are the same as the processes of steps S10 to S20 in FIG. 3.

3) http_get (Start URL) Command Transmission

The Web browser of the personal computer 300 transmits a http_get command (including the start URL) (step S82). Then, the Web browser connects to the URL of the Web server 400 via the Internet 800 by the http_get command, analyses received data in a http format acquired by the http_get command, and displays a login screen.

4) https_get (Session Number Request)

After encrypting the communication path to the Web server 400 by SSL, the personal computer 300 accesses the Web server 400, and requests the server for the issuance of a session number (step S84). Here, the session number to be issued by the Web server 400 is to be distinguishable from a login session number of another user by the use of a random number or the like, or it is to be invalidated when a certain expiration date is reached. As will be described later, the session number is a number that is used for confirming the login by a user, and it is to be a unique number.

For example, the personal computer 300 transmits "https://www.web_server.co.jp/login.html+get_session_number.cgi" by the https_get command. The Web server 400 describes a session number generated by an execution code (CGI script or the like) in an html format, and returns it to the https_get (step S85).

5) https_get (SAM URL, login_URL, Session Number)

The personal computer 300 accesses the SAM server 500 after encrypting the communication path to the SAM server 500 by SSL, and transmits to the SAM server 500 a login request command to the Web server 400 (step S86). At this time, the URL of the Web server 400, which is the login destination, the URL of the SAM server 500, and the session number information acquired from the Web server 400 in step S85 are added to the request command as arguments. Additionally, the URL of the login destination and the URL of the SAM server 500 are read out from the memory of the contactless communication card 100.

For example, the personal computer 300 transmits "https://www.sam_server.co.jp/remote_login.cgi?URL=www.web_server.co.jp?session=XXX" by the https_get command, and the SAM server 500 activates an execution code (CGI script or the like) for login information acquisition.

5.1) Login Information Acquisition

Next, the SAM server 500 acquires login information from the secure area of the contactless communication card 100 (step S88). The acquisition method here is the same as the process described with FIG. 4 of the first embodiment, but the Web server 400 does not mediate between the SAM server 500 and the personal computer 300. The second embodiment is different from the first embodiment in that the SAM server 500 and the personal computer 300 directly communicate with each other.

Figure 9:
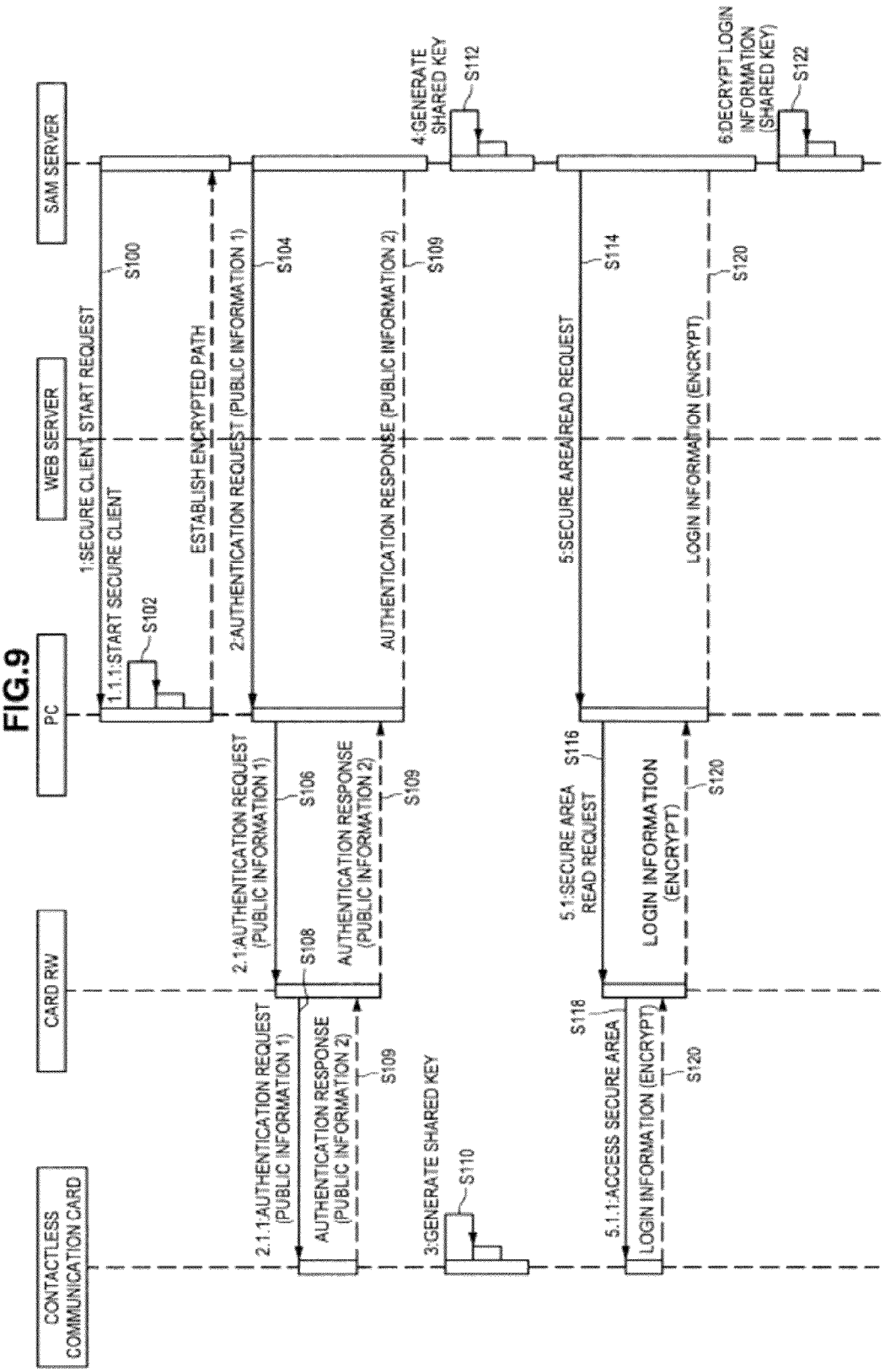
FIG. 9 is a sequence diagram showing the process of step S88.

FIG. 9 is a sequence diagram showing the process of step S88.

1) Secure Client Start Request

First, the SAM server 500 issues a secure client start request to the personal computer 300 by transmitting the http_get command or the like (step S100). The secure client is a program held in the personal computer 300.

1.1.1) Secure Client Start

The CPU 308 within the personal computer 300 that received the security client start command starts the security client (step S102). This client program is a program that encrypts the communication path between the SAM server 500 and the personal computer 300, and that also converts the card control command received from the SAM server 500 to a control command of the card reader/writer 200 and performs card control for the contactless communication card 100. This causes the path from the personal computer 300 to the SAM server 500 to be encrypted, and causes a packet to be transmitted/received between the SAM server 500, the Web server 400, and the personal computer 300 to be encrypted. Accordingly, what kind of command is transmitted to the contactless communication card 100 can be hidden 2) Authentication Request (Public Information 1)

The SAM server 500 that established the encrypted communication path transmits an authentication request command to the personal computer 300 to request the contactless communication card 100 for the authentication of the encryption (step S104). Public information (public key) 1 generated by a random number N1 and a private key A is included in this command. The authentication request is performed in an encrypted transmission path between the SAM server 500, the Web server 400, and the personal computer 300. Additionally, it is assumed that the contactless communication card 100 is in proximity or in contact with the card reader/writer 200 at this time point, and that it is able to communicate with the card reader/writer 200.

2.1) Authentication Request (Public Information 1)

After converting the authentication request command to that for the card reader/writer 200, the personal computer 300 transmits the same to the card reader/writer 200 (step S106).

2.1.1) Authentication Request (Public Information 1)

After converting the authentication request command to an RF signal, the card reader/writer 200 transmits the same to the contactless communication card 100 (step S108). The private key A is stored in the contactless communication card 100, and thus the contactless communication card 100 generates public information (public key) 2 by this key A and a random number N2. The public information 2 is returned to the SAM server 500 via the card reader/writer 200 and the personal computer 300 (step S109).

3), 4) Shared Key Generation

By transmitting/receiving and exchanging the public information 1 and 2, the contactless communication card 100 and the SAM server 500 each generate a shared key (private key), which is the same key for both the contactless communication card 100 and the SAM server 500 (steps S110, S112), and the shared key is shared. After the shared key is generated, a read value of a necessary area in the secure area of the contactless communication card 100 is transmitted, being encrypted by this shared key. Additionally, as with the first embodiment, the generation of the shared key from step S104 to step S112 can be performed by a general method called "Diffie-Hellman key exchange". The encrypted communication path from the SAM server 500 to the contactless communication card 100 is formed in this manner, and the SAM server 500 and the contactless communication card 100 will be in a state where secure communication is possible.

5) Security Area Read Request

The SAM server 500 acquires the login information (username, password, and the like) written in the secure area of the contactless communication card 100. To do this, the SAM server 500 transmits to the personal computer 300 a Read request for the secure area of the contactless communication card 100, using the encrypted communication path (step S114). Information on an area to be accessed (service area) on the memory 106 of the contactless communication card 100 is included in the Read request for the secure area.

5.1) Secure Area Read Request

When the Read request for the secure area is received, the security client on the personal computer 300 converts the Read request for the secure area into a command format for the card reader/writer 200. Then, the security client transmits the Read request in converted command format to the card reader/writer 200 (step S116).

5.1.1) Secure Area Access

The card reader/writer 200 that received the Read request for the secure area accesses the secure area of the contactless communication card 100 (step S118). The contactless communication card 100 encrypts the login information (username and password) stored in the secure area by the shared key, and returns the same to the SAM server 500 via the encrypted transmission path (step S120).

6) Login Information Decryption

When the login information of the contactless communication card 100 is received from the encrypted transmission path, the SAM server 500 decrypts the encrypted login information by using the shared key (step S122).

The SAM server 500 can acquire the login information from the contactless communication card 100 in step S88 in FIG. 8 by the sequence in FIG. 9 described above.

5.2) Communication Path Encryption

The SAM server 500 that acquired the login information connects to the Web server 400 that is specified by the login URL acquired in step S86 in FIG. 8, and encrypts the communication path by a process of SSL or the like (step S90 in FIG. 8).

5.3) Login Request (Login Information, Session Number)

The SAM server 500 transmits to the Web server 400 a command including the login information (the username, the password, the session number, and the like) (step S92). The Web server 400 can identify for which session the login from the SAM server 500 is meant by receiving the session number. The Web server 400 checks the TRUE/FALSE of the login information, and then, in case of TRUE, performs login and transmits a login complete notification to the SAM server 500 (step S94). The SAM server 500 that received the login complete notification similarly returns a login complete notification to the personal computer 300 (step S95).

6) https_get (Login Confirmation, Session Number)

When the login complete notification is received, the personal computer 300 transmits the session number to the Web server 400 (step S96), and confirms that the login from the SAM server 500 is complete. For example, the personal computer 300 transmits "https://www.sample_web_server.co.jp/sam_login_cfm.cgi?session=YYY" by a https_get command, and the Web server 400 returns a login result. This causes a screen after login to be displayed on the screen of the personal computer 300. Accordingly, a user can check on the Web browser screen of the personal computer 300 that he/she has logged in.

Figure 10:
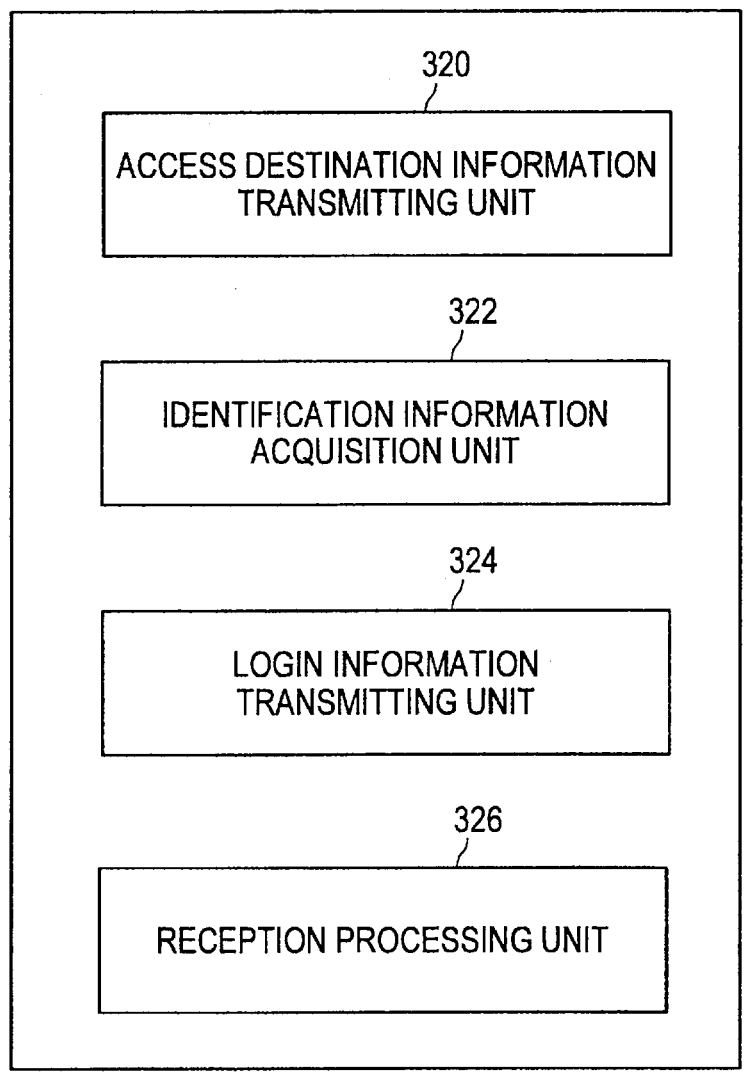
FIG. 10 is a functional block diagram showing the configuration of a personal computer according to the second embodiment.

FIG. 10 is a functional block diagram showing the configuration of the personal computer 300 according to the second embodiment. As shown in FIG. 10, the personal computer 300 includes an access destination information transmitting unit 320, an identification information acquisition unit 322, a login information transmitting unit 324, and a reception processing unit 326. Each functional block can be configured from hardware, the CPU 308, and software (program) for causing the CPU 308 to function that are provided in the personal computer 300. The program can be stored in a hard disk provided in the personal computer 300, or in a recording medium such as a memory that is externally connected to the personal computer 300.

As described above, according to the second embodiment, by using a session number at the time of displaying the URL of the Web server 400 on the Web browser of the personal computer 300, the Web server 400 and the SAM server 500 can be operated in parallel. Therefore, the information of the access destination to which login is performed based on the session number can be displayed on the personal computer 300 in a state where the Web server 400 and the SAM server 500 are operating parallel to each other.

3. Third Embodiment

Next, an explanation will be given on the third embodiment of the present disclosure. The third embodiment relates to a virtual browser that is a localized secure area.

Figure 11:
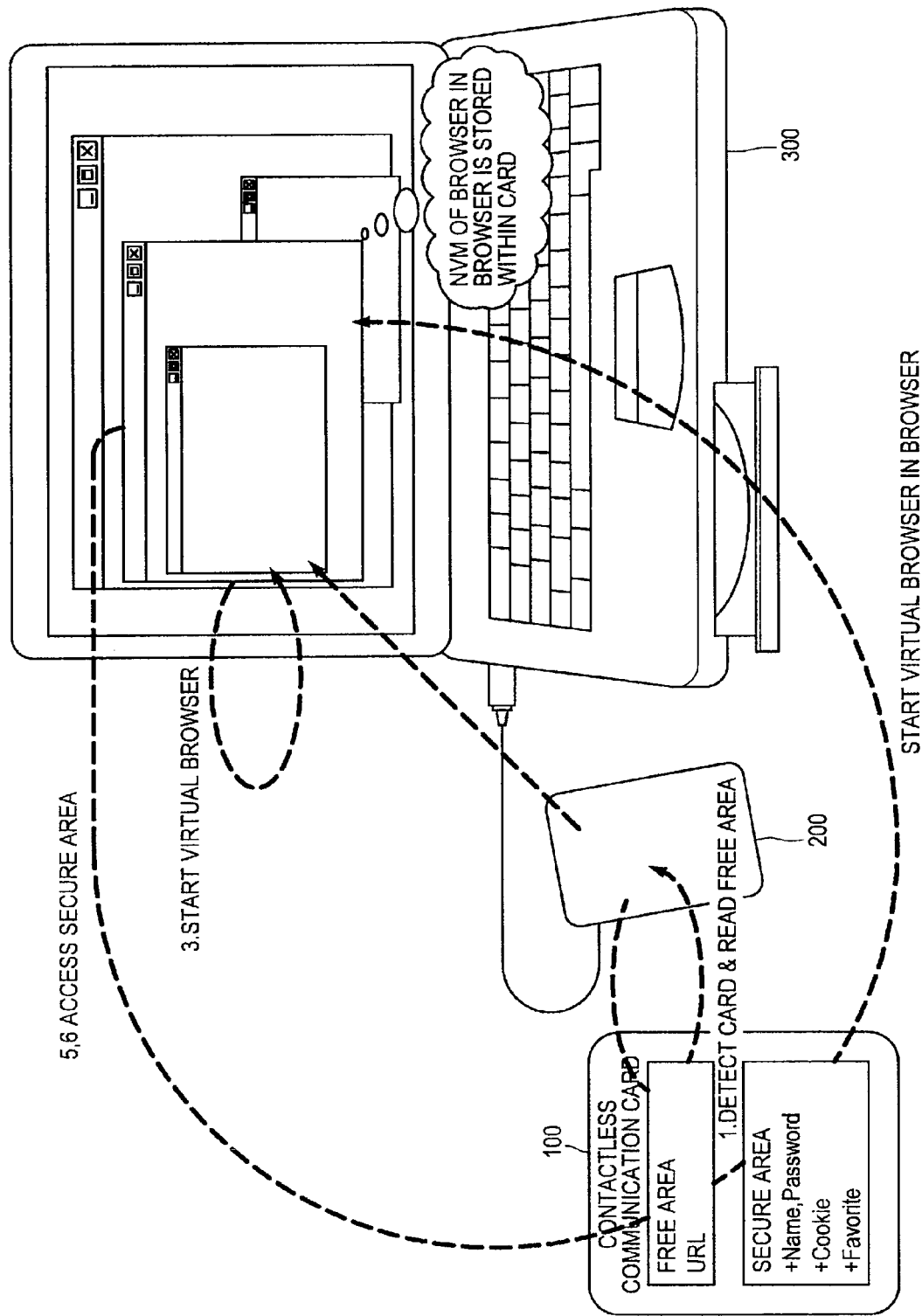
FIG. 11 is a conceptual diagram schematically showing a system configuration according to a third embodiment, and information exchange.
Figure 12:
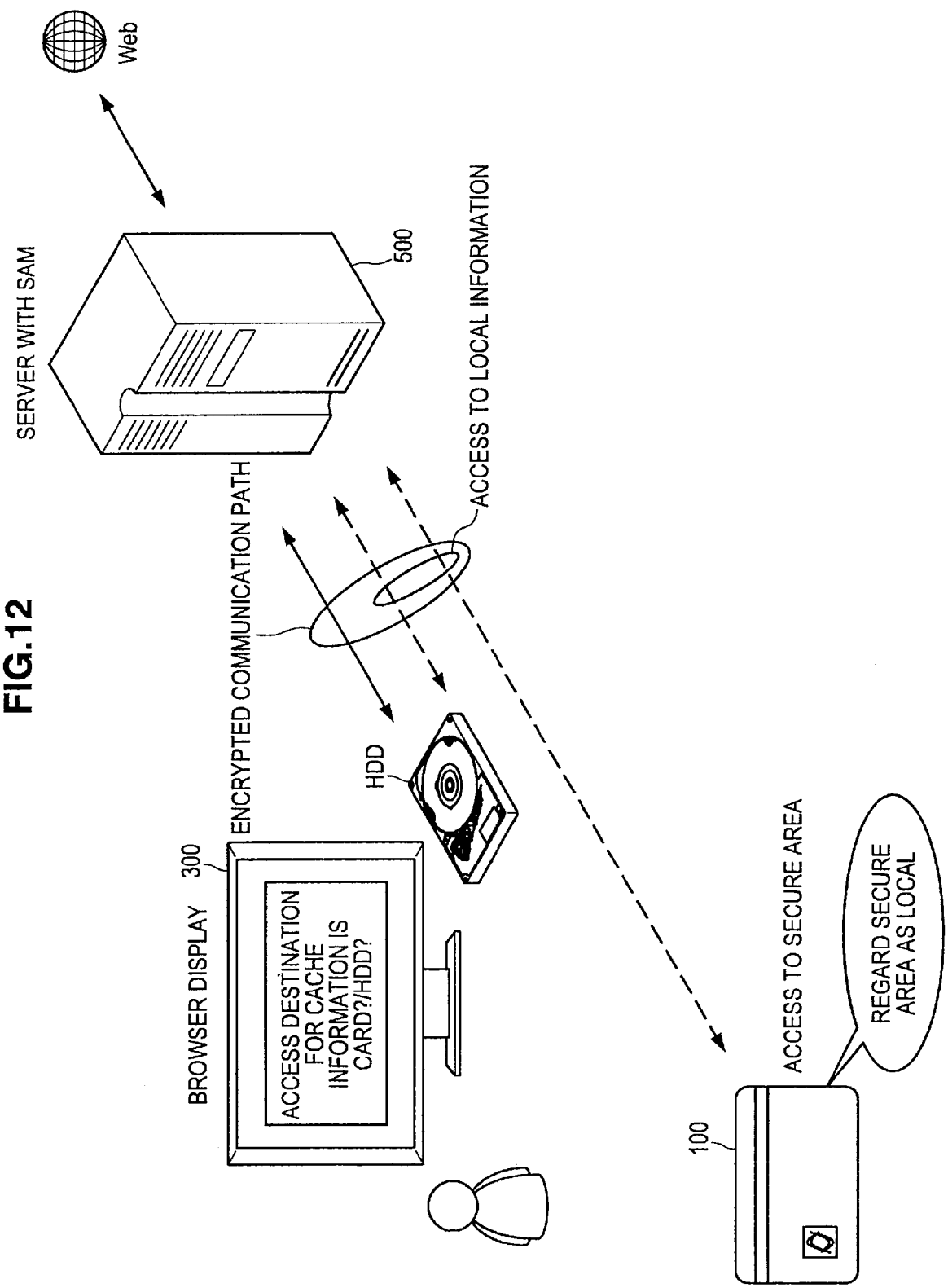
FIG. 12 is a conceptual diagram schematically showing a system configuration according to the third embodiment, and information exchange.

FIGS. 11 and 12 are conceptual diagrams schematically showing system configurations according to the third embodiment, and information exchange. The system of the present embodiment also includes the contactless communication card 100, the card reader/writer 200, the personal computer 300, the Web server 400, and the SAM (Secure Application Module) server 500.

Describing the concept of information exchange of the present embodiment based on FIGS. 11 and 12, the contactless communication card 100 includes within its memory a free area and a secure area. Information such as a URL is stored in the free area, and login information such as a username and a password is stored in the secure area. When the contactless communication card 100 is brought into contact or into proximity with the card reader/writer 200, the browser of the SAM server 500 is started. Furthermore, by the SAM server 500 communicating with the Web server 400, the browser (virtual browser) of the SAM server 500 is displayed, with the URL of the Web server 400 displayed thereon, on the personal computer 300.

In case the URL of the Web server 400 requests for the login information such as a username and a password, the SAM server 500 acquires the login information from the contactless communication card 100 through an encrypted communication path, as shown in FIG. 12.

Furthermore, in case the Web server 400 issues a local access request, the SAM server 500 accesses local information. At this time, the SAM server 500 accesses a storage medium such as a hard disk drive provided in the personal computer 300 or the secure area of the contactless communication card 100 depending on the selection of a user, and writes in or reads out cache information or the like, as shown in FIG. 12. This enables the user to access the URL of the Web server 400 via the virtual browser on the SAM server 500 by simply bringing the contactless communication card 100 into contact or into proximity with the card reader/writer 200.

Figure 13:
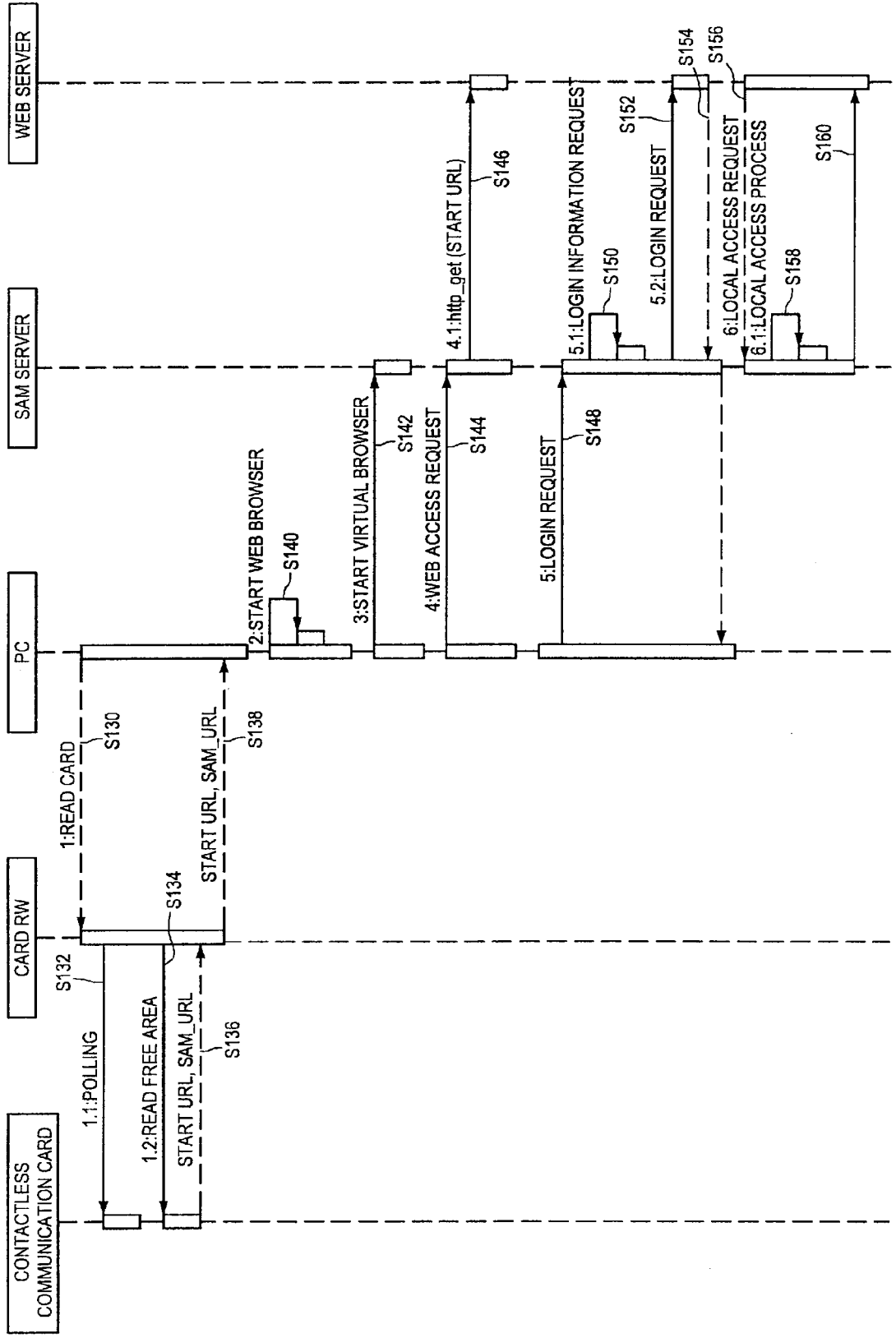
FIG. 13 is a sequence diagram showing a process of the third embodiment.

Next, the system of the present embodiment will be described in detail based on FIGS. 13 to 15. The system configuration according to the third embodiment and the configurations of the contactless communication card 100, the card reader/writer 200, the personal computer 300, the Web server 400, and the SAM server 500 are the same as those in FIG. 2. FIG. 13 is a sequence diagram showing a process of the third embodiment.

1) Contactless Communication Card 100 Reading

First, the personal computer 300 reads the contactless communication card (steps S130 to S138). Then, the personal computer 300 starts a Web browser (step S140). The processes of steps S130 to S138 are the same as the processes of steps S10 to S20 in FIG. 3

3) Virtual Browser Start

The Web browser of the personal computer 300 connects to the destination URL of the SAM server 500 via the Internet 800, and transmits a start request for a virtual browser to the SAM server 500 by a http_get command (step S142). This causes the Web browser (virtual browser) to be launched at the SAM server 500. Thereafter, html data that the virtual browser receives from the Web server 400 is normally transferred to the personal computer 300, and the Web browser of the personal computer 300 will analyze the received data and display the same on a screen. Accordingly, as shown in FIG. 11, on the display screen of the personal computer 300, the virtual browser of the SAM server 500 is displayed on the Web browser of the personal computer 300 and information specified by the URL of the Web server 400 is displayed on the virtual browser.

4) Web Access Request

The personal computer 300 transmits to the SAM server 500 a request command for Web access after adding the URL information of the destination acquired from the card in step S138 (S144).

4.1) http_get (Start URL)

The SAM server 500 transmits a http_get command including the received URL to the Web server 400 (step S146), and transfers received http data to the personal computer 300. This causes the URL of the Web server 400 to be displayed on the display screen of the personal computer 300.

5) Login Request

Here, in case the Web server 400 to be started displays a login screen, the personal computer 300 transmits a login request command to the SAM server 500 (step S148).

.1) Login Information (Username, Password) Acquisition

When the login request command is received, the SAM server 500 performs a process of acquiring login information (step S150). The login information is acquired from the secure area of the contactless communication card 100 by a procedure similar to that of the second embodiment described with FIG. 9.

5.2) Login Request

The SAM server 500 performs a login request to the Web server 400 at the URL read from the contactless communication card 100 in steps S130 to S138, by using the login information acquired in step S150 (step S152).

6) Local Access Request

Depending on a Web server 400, at the time of login, matching between a history of login to the Web server 400 and a login history stored in a local storage medium of a user's personal computer 300 (the login history is stored in a Cookie) may be performed in addition to matching for the login information, to perform user (login) authentication. In this case, the Web server 400 issues a local (personal computer 300) access request (step S156). Also, a user can select a URL to be displayed from "Favorites" stored in the local hard disk drive (HDD) of the personal computer 300. These pieces of information are notified from the Web server 400 to the personal computer 300 via the virtual browser of the SAM server 500. Additionally, the local access destination is not limited to the Cookie and the Favorites mentioned above, and it may be any of all the information that the browser stores in the local HDD of the personal computer 300, such as History.

6.1) Local Access Process

When the local access request is received, the SAM server 500 performs a local access process (step S158). The read-source/write-destination of the local information can be selected from the storage medium, such as a hard disk, included in the personal computer 300 itself and the external contactless communication card 100 that has the security area.

Figure 14:
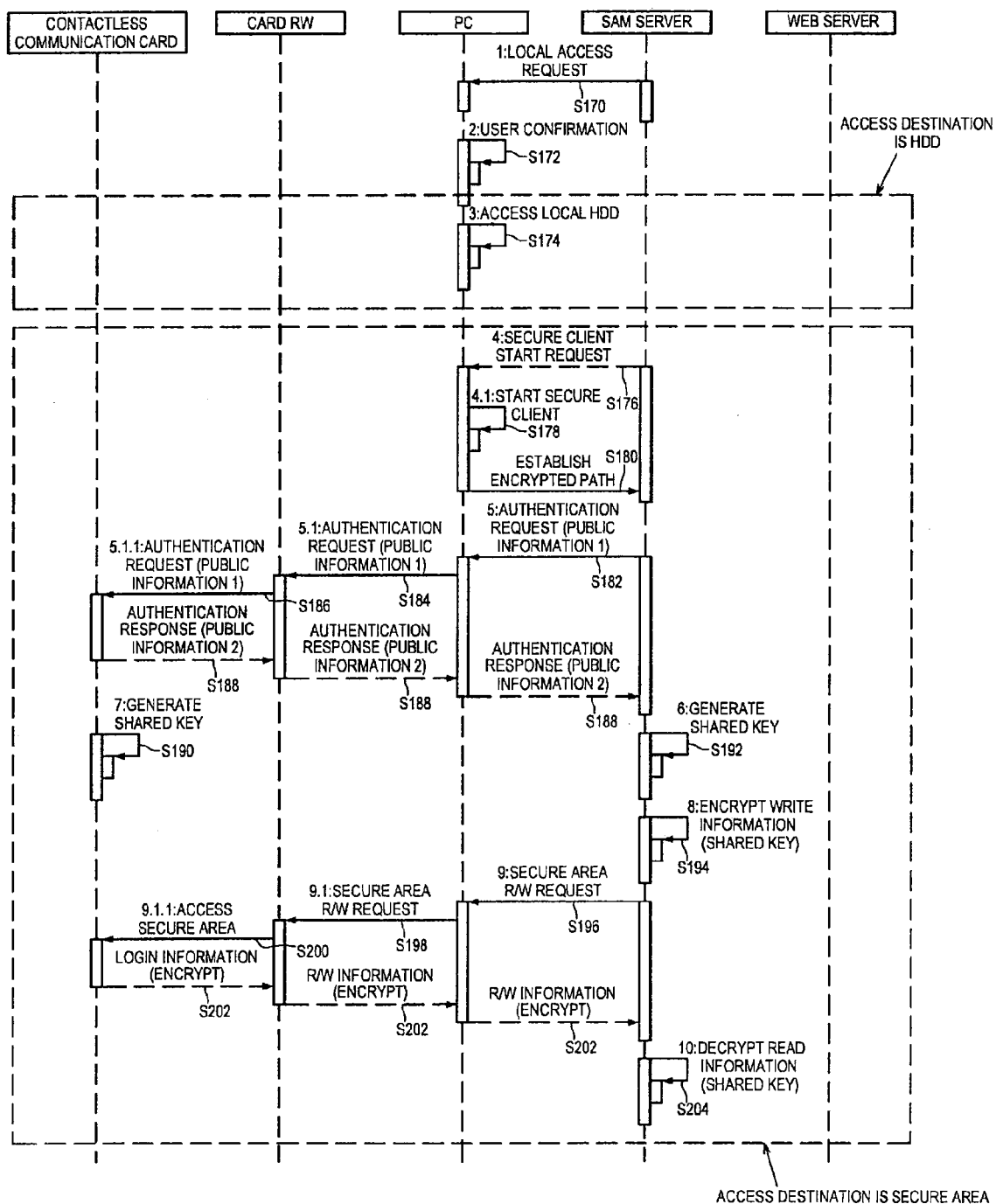
FIG. 14 is a sequence diagram showing the details of a local access process of step S158 in FIG. 13.

FIG. 14 is a sequence diagram showing the details of the local access process of step S158.

1) Local Access Request

First, the SAM server 500 issues the local access request to the personal computer 300 (step S170).

2) User Confirmation

The personal computer 300 that received the local access request from the Web server 400 creates a list of storage media (including the contactless communication card 100) to which access is possible. Also, the personal computer 300 that received the local access request displays to a user a confirmation screen showing "Allow or Deny Local Access". When "Allow" is selected, a screen is displayed for making the user select one of "the local HDD of the personal computer 300 and the contactless communication card 100 (secure area)" as a candidate for the access destination (step S172). Then, the selection result of the access destination by the user is transmitted to the SAM server 500. Returning to FIG. 14, when the HDD is selected in step S172, the HDD is set as the access destination for the local information that is requested by the Web server 400, and reading/writing thereafter will be performed on the HDD. Additionally, the local access destination of the personal computer 300 is not limited to the HDD, and it may be any storage medium that is included in the personal computer 300, such as a flash memory (NVM), or that is connected to the personal computer 300.

4) Secure Client Start Request

On the other hand, when the contactless communication card 100 is selected in step S172, the SAM server 500 transmits a request command for secure client start to the personal computer 300 (step S176).

4.1) Secure Client Start

The CPU 308 in the personal computer 300 that acquired the start command for the security client starts the security client (step S178). This client program encrypts the communication path between the SAM server 500 and the personal computer 300. Also, the client program converts a card control command received from the Sam server 500 to a control command of the card reader/writer 200, and performs card control for the contactless communication card 100.

5) Authentication Request (Public Information 1)

The SAM server 500 that established an encrypted communication path transmits an authentication request command to the personal computer 300 (step S182). This command includes public information 1 that is generated by a random number N1 and a private key A.

5.1) Authentication Request (Public Information 1)

After converting the authentication request command to that for the card reader/writer 200, the personal computer 300 transmits the same to the card reader/writer 200 (step S184).

5.1.1) Authentication Request (Public Information 1)

After converting the authentication request command to an RF signal, the card reader/writer 200 transmits the same to the contactless communication card 100. The private key A is stored in the contactless communication card 100, and thus the contactless communication card 100 generates public information 2 by this key A and a random number N2, and returns the public information 2 to the SAM server 500 via the personal computer 300 (step S188).

6), 7) Shared Key Generation

The contactless communication card 100 and the SAM server 500 generate a shared key, which is the same key for both the contactless communication card 100 and the SAM server 500 (steps S190, S192) from the transmitted/received public information 1 and 2. Thereafter, a read value of an area necessary for the security setting area of the contactless communication card 100 is transmitted, being encrypted by this shared key. Similarly to the first and second embodiments, the generation of the shared key can be performed by a method generally called "Diffie-Hellman key exchange".

8) Write Information Encryption (Shared Key)

When the type of access to the contactless communication card 100 from the Web server 400 is Write, the SAM server 500 encrypts write data by the shared key (step S194).

9) Security Area R/W Request

The SAM server 500 transmits to the personal computer 300 a Read request or a Write request for the security area (step S196). Information on the area to be accessed (service area) is included in the Read request or the Write request for the security area.

9.1) Secure Area Read/Write Request

The security client on the personal computer 300 converts the Read request or the Write request for the secure area into a command format for the card reader/writer 200. The security client transmits the Read request or the Write request in converted format to the card reader/writer 200 (step S198).

9.1.1) Secure Area Access

The card reader/writer 200 accesses the secure area of the contactless communication card 100 (step S200). The type of access to the secure area is classified into Read or Write. After being decrypted by the shared key, the Write information is written on an appropriate service area. Also, the Read information read out from a specified service area is encrypted by the shared key and is returned to the SAM server 500 (step S202).

10) Read Information Decryption (Shared Key)

Figure 15:
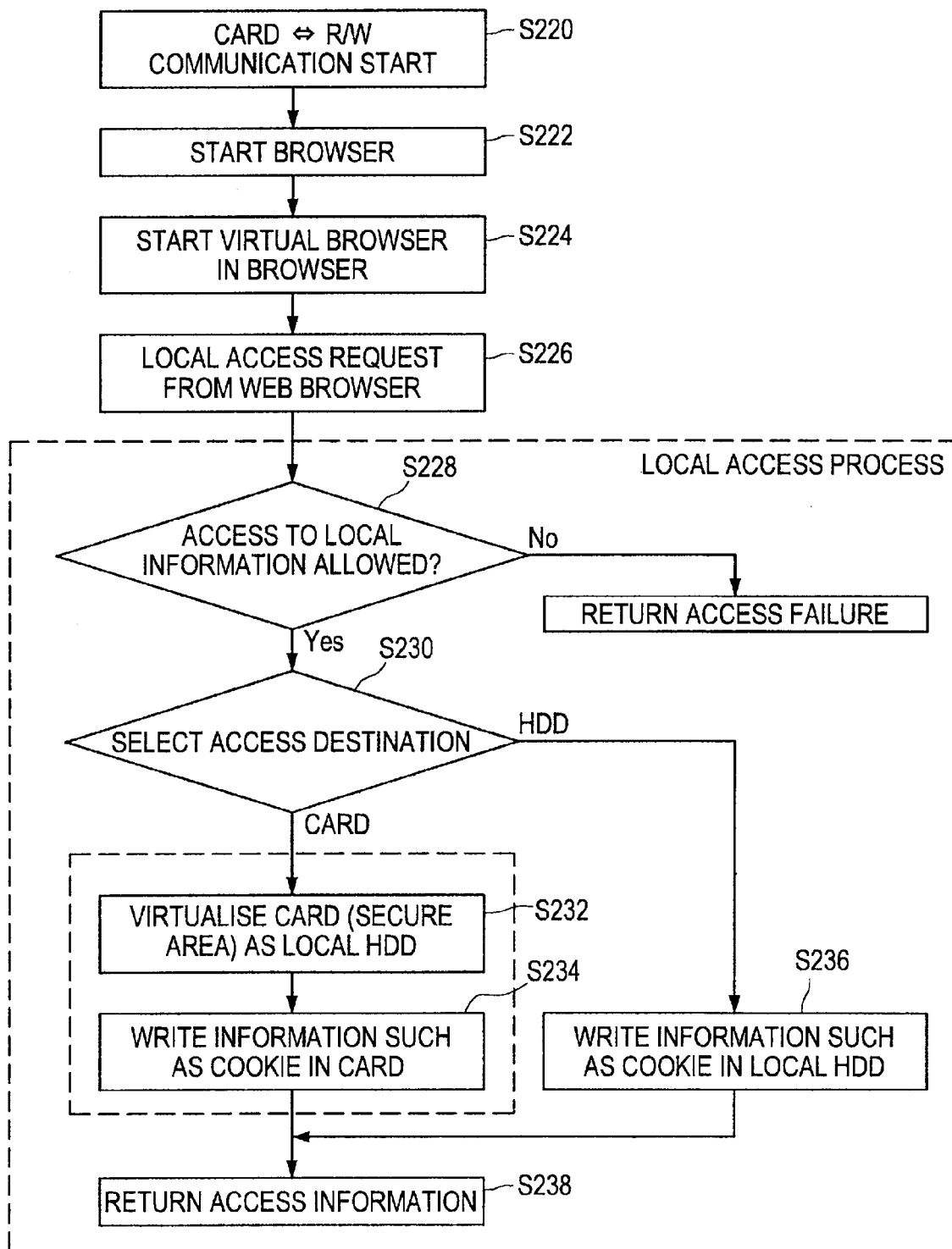
FIG. 15 is a flow chart for describing a local access process (step S228 and later steps) by a SAM server.

When the type of access to the contactless communication card 100 from the Web server 400 is Read, the Sam server 500 decrypts the Read data received in step S202 with the shared key FIG. 15 is a flow chart for describing a local access process (step S228 and later steps) by the SAM server 500 in the process described with FIGS. 13 and 14. Describing the process based on FIG. 15, the contactless communication card 100 and the card reader/writer 200 starts communication in step S220. Next, the Web browser of the personal computer 300 is started in step S222, and the virtual browser is started in the Web browser in the next step S224. The local access request is issued from the Web browser in the next step S226.

In step S228 and later steps, the SAM server 500 performs a local access process. In step S228, whether the access to local information is allowed by a user or not is determined, and in case the access is allowed, the process proceeds to step S230. In step S230, the access destination is selected by the user. On the other hand, in case the access is denied in step S228, access failure is returned.

When the access destination is the contactless communication card 100, the process proceeds to step S232, and the secure area of the contactless communication card 100 is made to be a virtual local HDD. Next, in step S234, information such as a Cookie and the like is written in the contactless communication card 100. The process here corresponds to steps S194 to S204 in FIG. 14. For example, in a case a user uses the personal computer 300 that is located in an Internet cafe or the like, it is not desirable that personal information is written in the HDD of the personal computer 300. Thus, by making the contactless communication card 100 the access destination, the personal information can be written in the secure area of the card 100. At this time, since an encrypted transmission path is constructed between the contactless communication card 100 and the SAM server 500, information can be safely written in the card 100.

On the other hand, when the HDD is selected in step S230, information such as a Cookie is written in the HDD of the personal computer 300. The process here corresponds to step S174 in FIG. 14. After the steps S234 and S236, the process proceeds to step S238, and access information is returned.

Figure 16:
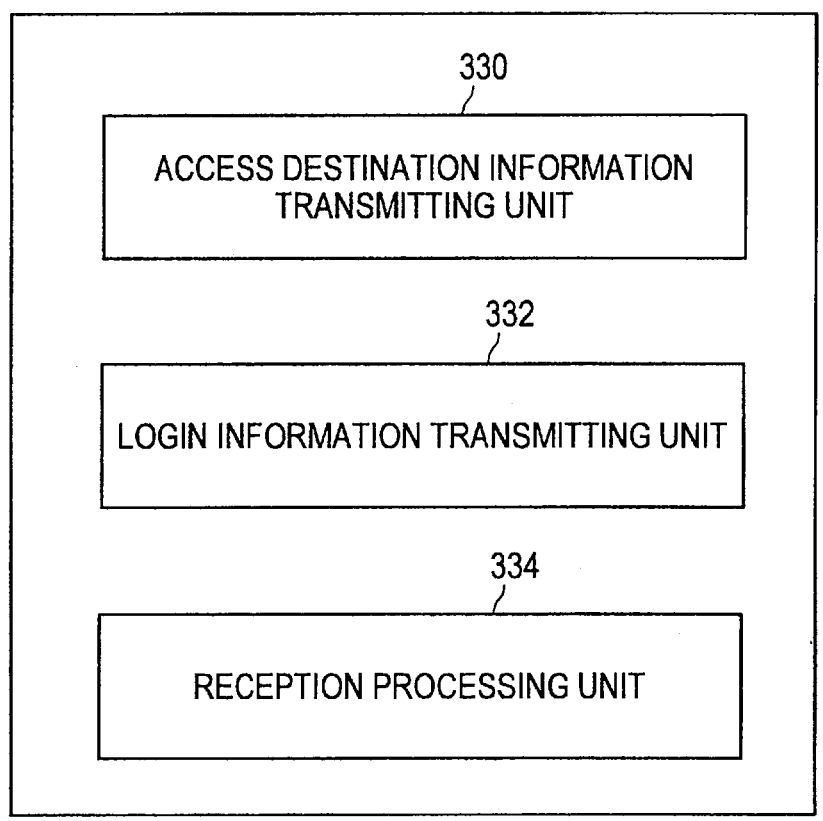
FIG. 16 is a functional block diagram showing the configuration of a personal computer according to the third embodiment.

FIG. 16 is a functional block diagram showing the configuration of the personal computer 300 according to the third embodiment. As shown in FIG. 16, the personal computer 300 includes an access destination information transmitting unit 330, a login information transmitting unit 332, and a reception processing unit 334. Each functional block can be configured from hardware, the CPU 308, and software (program) for causing the CPU 308 to function that are provided in the personal computer 300. The program can be stored in a hard disk provided in the personal computer 300, or in a recording medium such as a memory that is externally connected to the personal computer 300.

Figure 17:
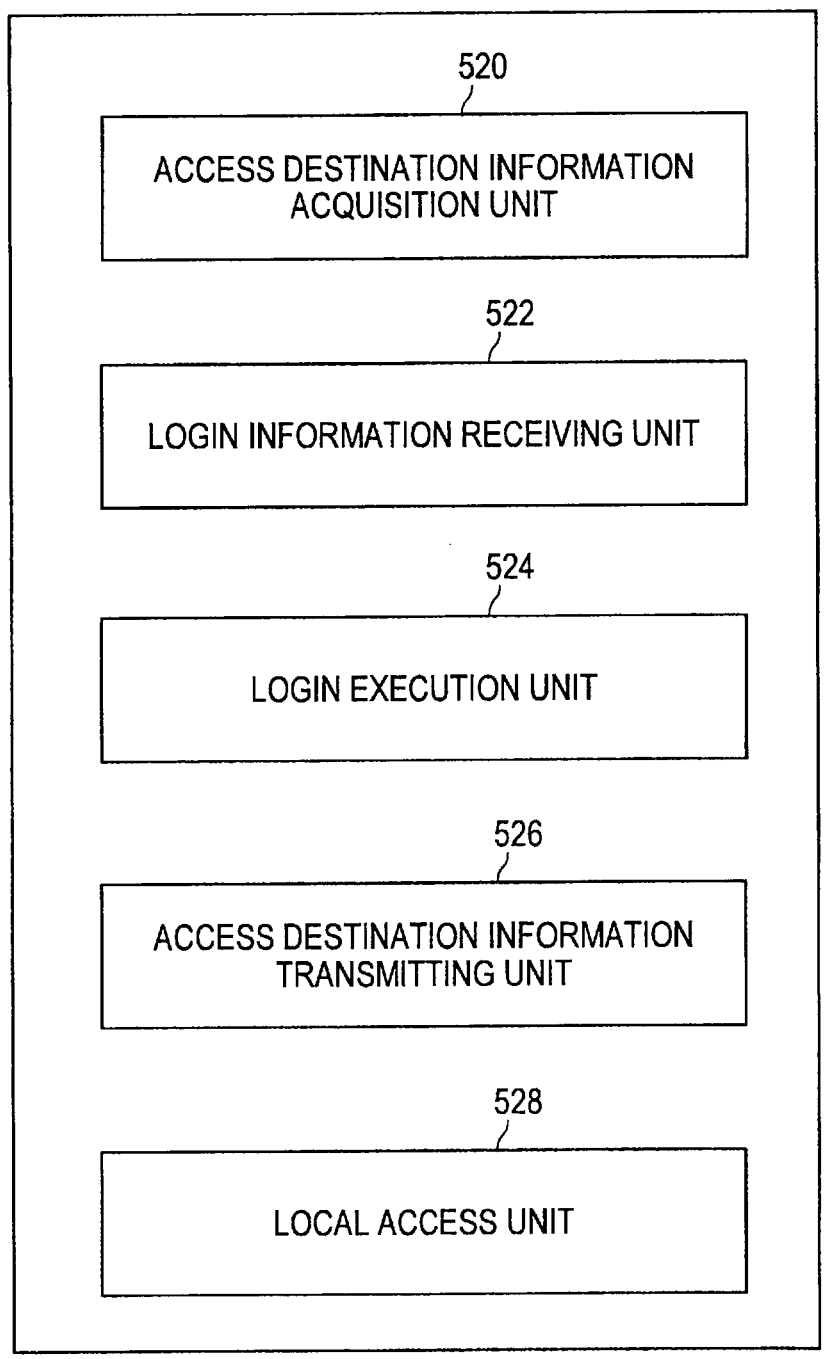
FIG. 17 is a functional block diagram showing the configuration of a SAM server according to the third embodiment.

FIG. 17 is a functional block diagram showing the configuration of the SAM server 500 according to the third embodiment. As shown in FIG. 17, the SAM server 500 includes an access destination information acquisition unit 520, a login information receiving unit 522, a login execution unit 524, an access destination information transmitting unit 526, and a local access unit 528. Each functional block can be configured from hardware, a CPU 502, and software (program) for causing the CPU 502 to function that are provided in the SAM server 500. The program can be stored in a hard disk provided in the SAM server 500, or in a recording medium such as a memory that is externally connected to the SAM server 500.

As described above, in the third embodiment, the personal computer 300 basically has the function of displaying a virtual browser of the SAM server 500, and the function of notifying the SAM server 500 of a user's selection. That is, the personal computer 300 plays the role of an intermediary at the time of a user viewing the virtual browser of the SAM server 500. Also, when reading of the user's personal information or saving of Cookie information or the like becomes necessary during the viewing of the virtual browser, it is possible to access the storage medium of the personal computer 300 or the secure area of the contactless communication card 100 depending on the selection of the user.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. An information processing apparatus comprising:
    a processor;
    a communication unit operatively coupled to the processor; and
    a memory device operatively coupled to the processor, the memory device storing instructions that cause the processor, in cooperation with the communication unit and the memory device, to, in response to a contactless communication:
        (a) acquire address information from a second memory device having:
            (i) a free area including said address information; and
            (ii) a secure area including account information;
        (b) connect to a resource of a server using said acquired address information; and
        (c) cause a security server, separate from the information processing apparatus, to:
            (i) establish a secure communication path with the information processing apparatus via the server;
            (ii) acquire said account information from the second memory device via the server using the secure communication path; and
            (iii) transmit said acquired account information to the server such that the server enables a user to access the resource of the server using said account information;
    wherein the account information included in the secure area is encrypted account information, and
    wherein the instructions cause the processor to:
    acquire the encrypted account information from the secure area;
    transmit the encrypted account information to the server for transmission to the security server; and
    causing the security server to transmit decrypted account information to the server.

2. The information processing apparatus of claim 1, wherein the contactless communication occurs in response to a communication card being brought into contact or into proximity with a card reader/writer.

3. The information processing apparatus of claim 1, wherein the instructions cause the processor to request, from the server, a session number used for confirming access to the resource of the server.

4. The information processing apparatus of claim 1, wherein the second memory device is included in a contactless communication card that is separate from the information processing apparatus.

5. The information processing apparatus of claim 1, wherein the address information includes a URL.

6. The information processing apparatus of claim 1, wherein the account information includes login information.

7. The information processing apparatus of claim 1, which includes a display device operatively coupled to the processor, wherein the instructions cause the processor to operate with the display device to display a login screen.

8. The information processing apparatus of claim 1, wherein the free space of the second memory device has no access restriction, and the secure space of the second memory device requires access through authentication and encryption.

9. The information processing apparatus of claim 1, wherein the instructions cause the processor to:
    receive a security client request command from the server that was generated by the security server; and encrypt the secure communication path based on the security client request.

10. A method of operating an information processing apparatus including instructions, the method comprising: in response to a contactless communication:
    (a) causing a processor to execute the instructions to acquire address information from a second memory device having:
        (i) a free area including said address information; and
        (ii) a secure area including account information;
    (b) causing the processor to execute the instructions to connect to a resource of a server using said acquired address information; and
    (c) causing the processor to execute the instructions to cause a security server, separate from the information processing apparatus, to:
        (i) establish a secure communication path with the information processing apparatus via the server;
        (ii) acquire said account information from the second memory device via the server using the secure communication path; and
        (iii) transmit said acquired account information to the server such that the server enables a user to access the resource of the server using said account information;
    wherein the account information included in the secure area is encrypted account information, and
    wherein the instructions cause the processor to:
    acquire the encrypted account information from the secure area;
    transmit the encrypted account information to the server for transmission to the security server; and
    causing the security server to transmit decrypted account information to the server.

11. A server comprising: a processor; a communication unit operatively coupled to the processor; and a memory device operatively coupled to the processor, the memory device storing instructions that cause the processor, in cooperation with the communication unit and the memory device, to, in response to a contactless communication:
    (a) connect to an information processing apparatus, said information processing apparatus being configured to connect to the server by using address information acquired from a second memory device having:
        (i) a free area including the address information; and
        (ii) a secure area including account information;
    (b) transmit secure communication path information between the information processing apparatus and a security server separate from the information processing apparatus for establishing a secure communication path between the information processing apparatus and the security server via the server;
    (c) acquire the account information from the security server separate, said security server being configured to acquire the account information from the secure area of the second memory device via the server using the secure communication path; and (d) enable a user to access a resource of the server using said acquired account information from the security server;

wherein the account information included in the secure area is encrypted account information, and wherein the instructions cause the processor to:

acquire the encrypted account information from the secure area;

transmit the encrypted account information to the server for transmission to the security server; and causing the security server to transmit decrypted account information to the server.

12. The server of claim 11, wherein the contactless communication occurs in response to a communication card being brought into contact or into proximity with a card reader/writer.

13. The server of claim 11, wherein the instructions cause the processor to issue a session number to the information processing apparatus, the session number being used for confirming access to the resource of the server.

14. The server of claim 11, wherein the address information includes a URL.

15. The server of claim 11, wherein the account information includes login information.

16. The server of claim 11, wherein the information processing apparatus includes the second memory device.

17. A method of operating a server including instructions, the method comprising: in response to a contactless communication:

(a) causing a processor to execute the instructions to operate with a communication unit to connect to an information processing apparatus, said information processing apparatus being configured to connect to the server by using address information acquired from a second memory device having:
   (i) a free area including the address information; and
   (ii) a secure area including account information;

(b) causing the processor to execute instructions to transmit secure communication path information between the information processing apparatus and a security server separate from the information processing apparatus for establishing a secure communication path between the information processing apparatus and the security server via the server;

(c) causing the processor to execute the instructions to acquire the account information from the security server, said security server being configured to acquire the account information from the secure area of the second memory device via the server using the secure communication path; and (d) causing the processor to execute the instructions to enable a user to access a resource of the server using said acquired account information from the security server;

wherein the account information included in the secure area is encrypted account information, and wherein the instructions cause the processor to:

acquire the encrypted account information from the secure area;

transmit the encrypted account information to the server for transmission to the security server; and causing the security server to transmit decrypted account information to the server.

18. An information processing apparatus comprising:
a processor;
a communication unit operatively coupled to the processor; and a first memory device operatively coupled to the processor, the memory device storing instructions that cause the processor, in cooperation with the communication unit and the memory device, to, in response to contactless communication:

(a) cause a display device to start a browser of a security server, wherein the security server is separate from the information processing apparatus;

(b) acquire address information from a second memory device having:
   (i) a free area including said address information; and
   (ii) a secure area including account information;

(c) via the browser of the security server, access a server using said acquired address information; and (d) cause the security server to:
   (i) establish a secure communication path with the information processing apparatus via the server;
   (ii) enable a user to select a first access destination or a second access destination;
   (iii) in response to the first access destination being selected, access the information processing apparatus; and
   (iv) in response to the second access destination being selected, access the secure area of the second memory device via the server using the secure communication path;

wherein the account information included in the secure area is encrypted account information, and wherein the instructions cause the processor to:

acquire the encrypted account information from the secure area;

transmit the encrypted account information to the server for transmission to the security server; and causing the security server to transmit decrypted account information to the server.

19. The information processing apparatus of claim 18, wherein the contactless communication occurs in response to a communication card being brought into contact or into proximity with a card reader/writer.

20. The information processing apparatus of claim 18, which includes a reader/writer operatively coupled to the processor.

21. The information processing apparatus of claim 20, wherein the instructions cause the processor to operate with the reader/writer to acquire the address information.

22. The information processing apparatus of claim 21, wherein the second memory device is included in a contactless communication card that is separate from the information processing apparatus.

23. The information processing apparatus of claim 18, wherein the address information includes a URL.

24. The information processing apparatus of claim 18, wherein the account information includes login information.

25. A method of operating an information processing apparatus including instructions, the method comprising:
in response to contactless communication:

(a) causing a processor to execute the instructions to cause a display device to start a browser of a security server, wherein the security server is separate from the information processing apparatus;

(b) causing the processor to execute the instructions to acquire address information from a second memory device having:
   (i) a free area including said address information; and
   (ii) a secure area including account information;

(c) causing the processor to execute the instructions to, via the browser of the security server, access a server using said acquired address information; and
(d) causing the security server to:
  (i) establish a secure communication path with the information processing apparatus via the server;
  (ii) enable a user to select a first access destination or a second access destination;
  (iii) in response to the first access destination being selected, access the information processing apparatus; and
  (iv) in response to the second access destination being selected, access the secure area of the second memory device via the server using the secure communication path;
wherein the account information included in the secure area is encrypted account information, and
wherein the instructions cause the processor to:
acquire the encrypted account information from the secure area;
transmit the encrypted account information to the server for transmission to the security server; and causing the security server to transmit decrypted account information to the server.

* * * * *